United States Patent [19]

Kazumi

[11] Patent Number: 5,278,603
[45] Date of Patent: Jan. 11, 1994

[54] CAMERA

[75] Inventor: Jiro Kazumi, Yokohama, Japan

[73] Assignee: Canon Kabushiki Kaisha, Tokyo, Japan

[21] Appl. No.: 654,029

[22] Filed: Feb. 12, 1991

Related U.S. Application Data

[63] Continuation-in-part of Ser. No. 633,115, Dec. 24, 1990, Pat. No. 5,097,283.

[30] Foreign Application Priority Data

Dec. 28, 1989 [JP] Japan .................................. 1-344811
Feb. 14, 1990 [JP] Japan .................................. 1-34457

[51] Int. Cl.⁵ ............................................... G03B 7/00
[52] U.S. Cl. ............................. 354/412; 354/289.12; 354/173.1
[58] Field of Search ................... 354/21, 412, 75, 266, 354/289.1, 289.12, 173.1, 412, 75, 76

[56] References Cited

U.S. PATENT DOCUMENTS

| | | | |
|---|---|---|---|
| 4,349,272 | 9/1982 | Holthusen | 355/69 |
| 4,783,672 | 11/1988 | Wirtz et al. | 354/21 |
| 4,816,855 | 3/1989 | Kitaura et al. | 354/415 |
| 4,853,733 | 8/1989 | Watanabe et al. | 354/412 |
| 4,855,779 | 8/1989 | Ishikawa et al. | 354/412 |
| 5,097,283 | 3/1992 | Kazumi | 354/412 |
| 5,181,062 | 1/1993 | Kazumi | 354/412 |

FOREIGN PATENT DOCUMENTS 0400528 12/1990 .

*Primary Examiner*—David M. Gray
*Attorney, Agent, or Firm*—Fitzpatrick, Cella, Harper & Scinto

[57] ABSTRACT

A camera including a detector for detecting set information in an information supplying apparatus, and a controller for performing a particular camera operation on the basis of the result of the detection by the detection means. The particular camera operation includes at least exposure control and the control of the movement of a recording medium.

31 Claims, 18 Drawing Sheets

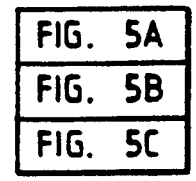
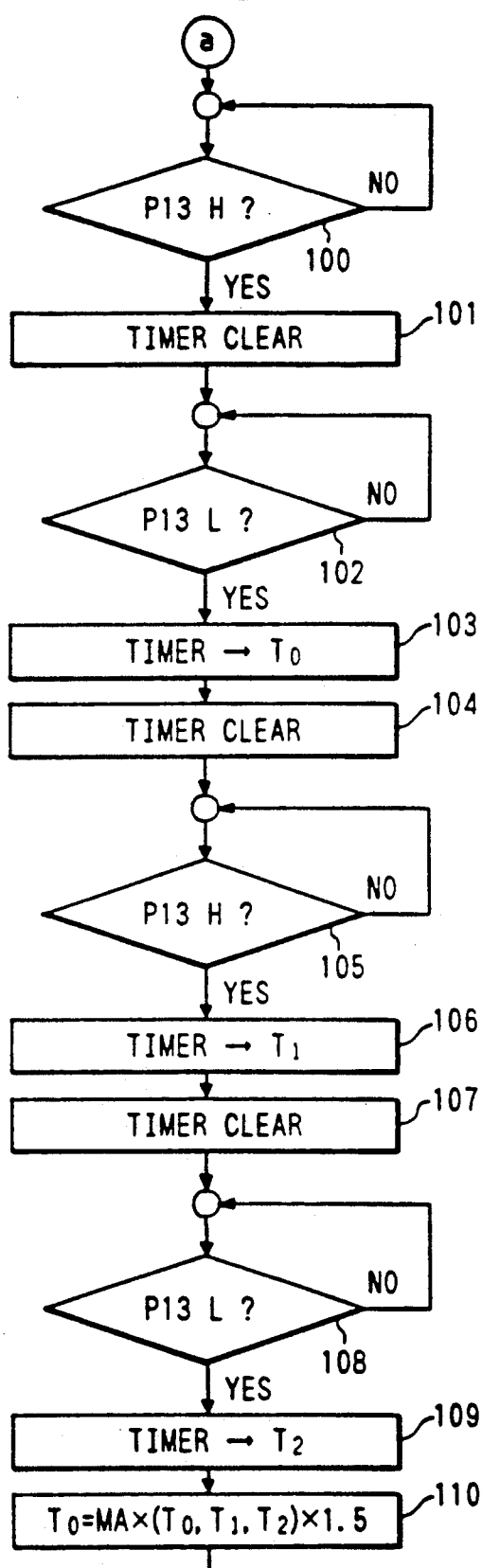
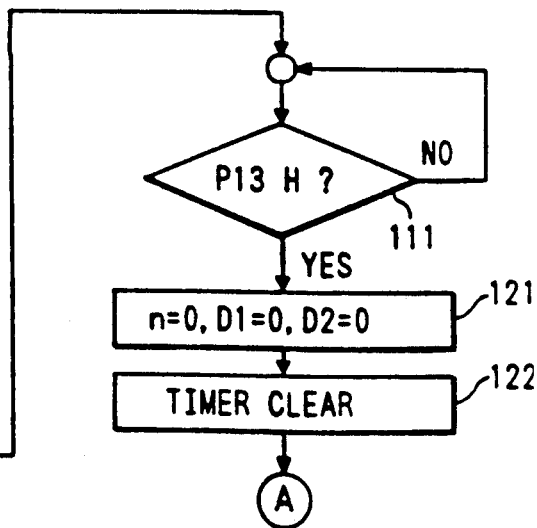

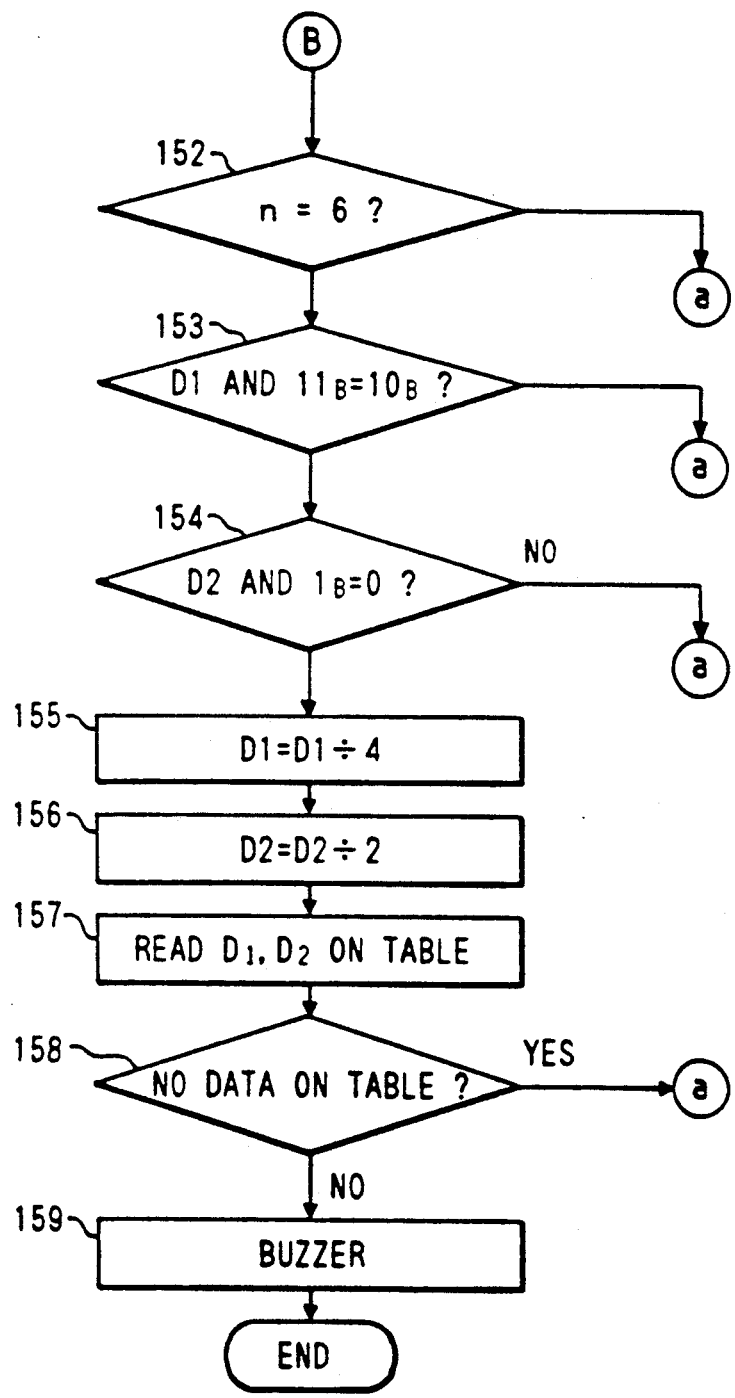

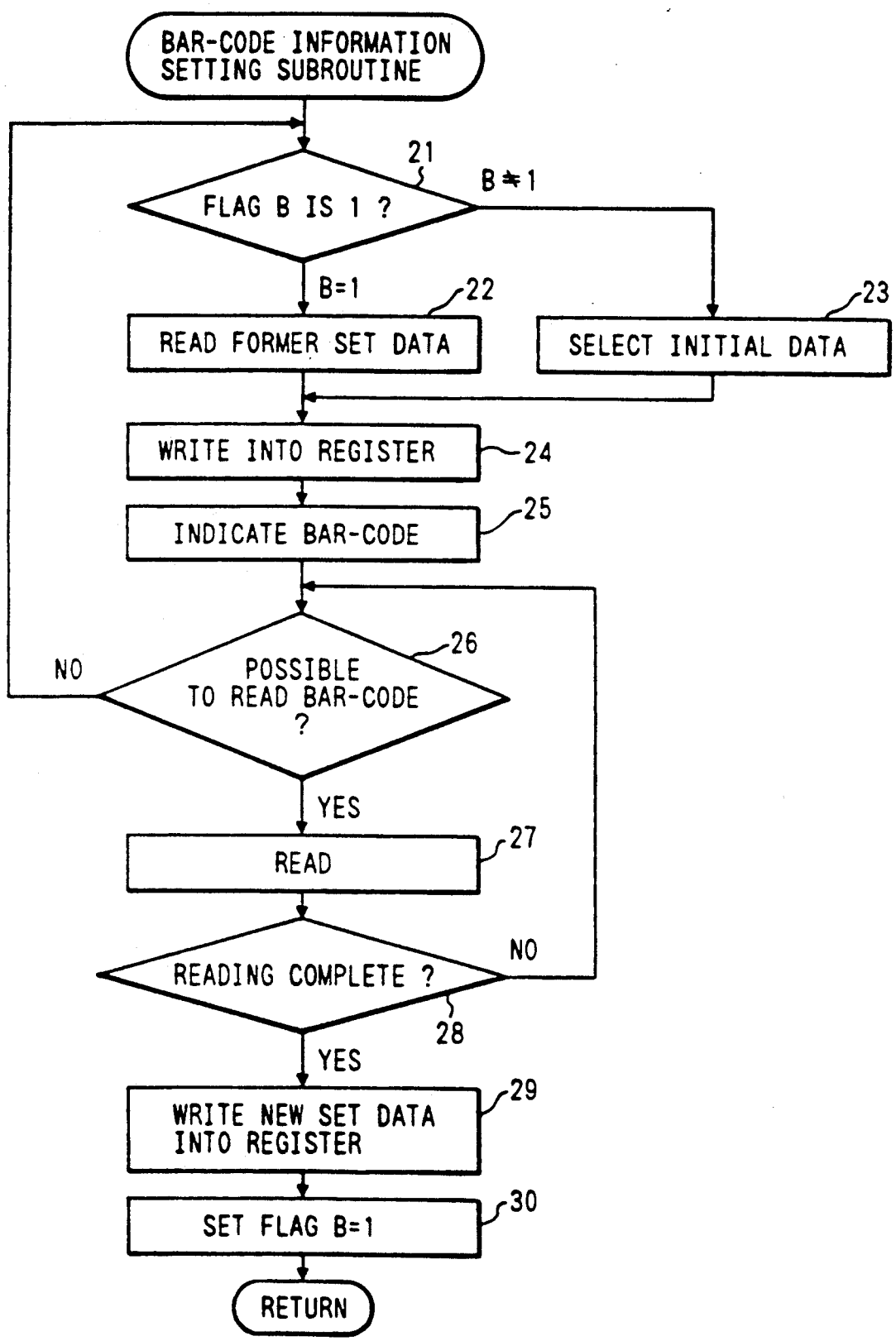

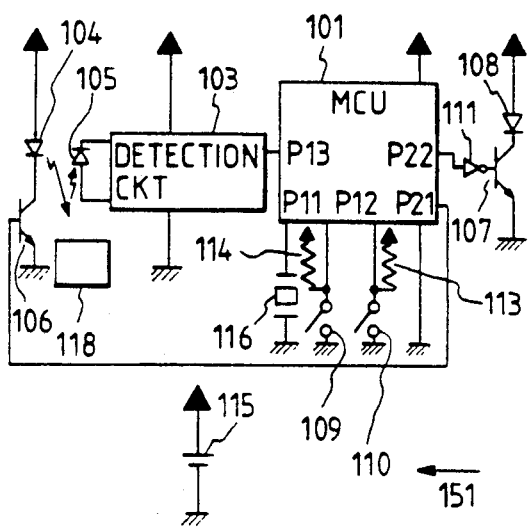
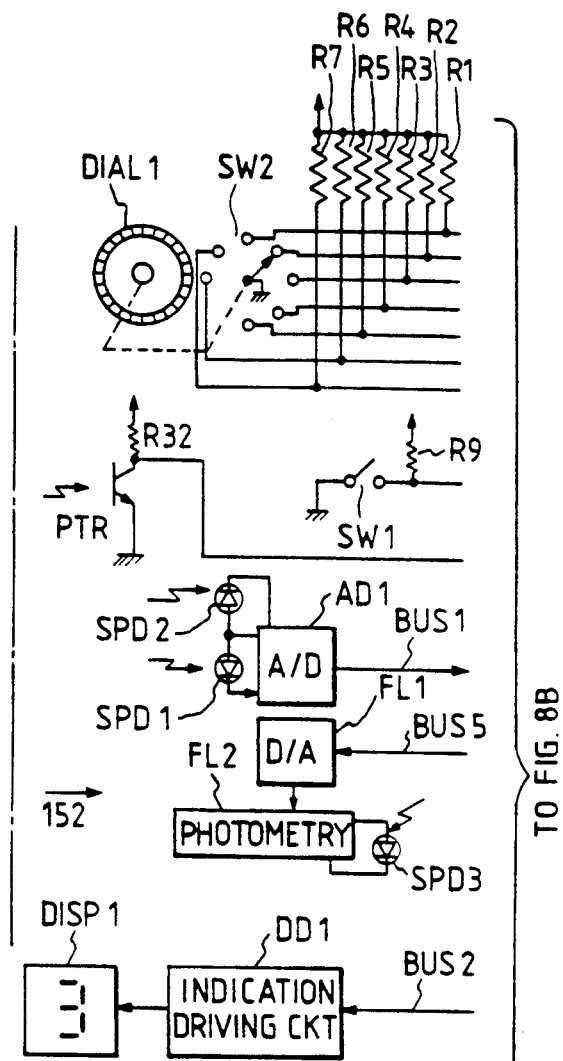
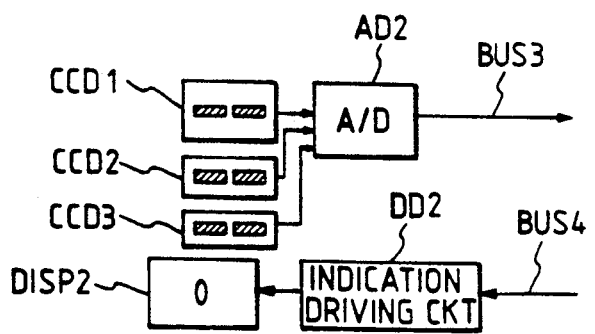

| BAR CODE | NUMERAL |
|---|---|
| 0 0 1 1 0 | 0 |
| 1 0 0 0 1 | 1 |
| 0 1 0 0 1 | 2 |
| 1 1 0 0 0 | 3 |
| 0 0 1 0 1 | 4 |
| 1 0 1 0 0 | 5 |
| 0 1 1 0 0 | 6 |

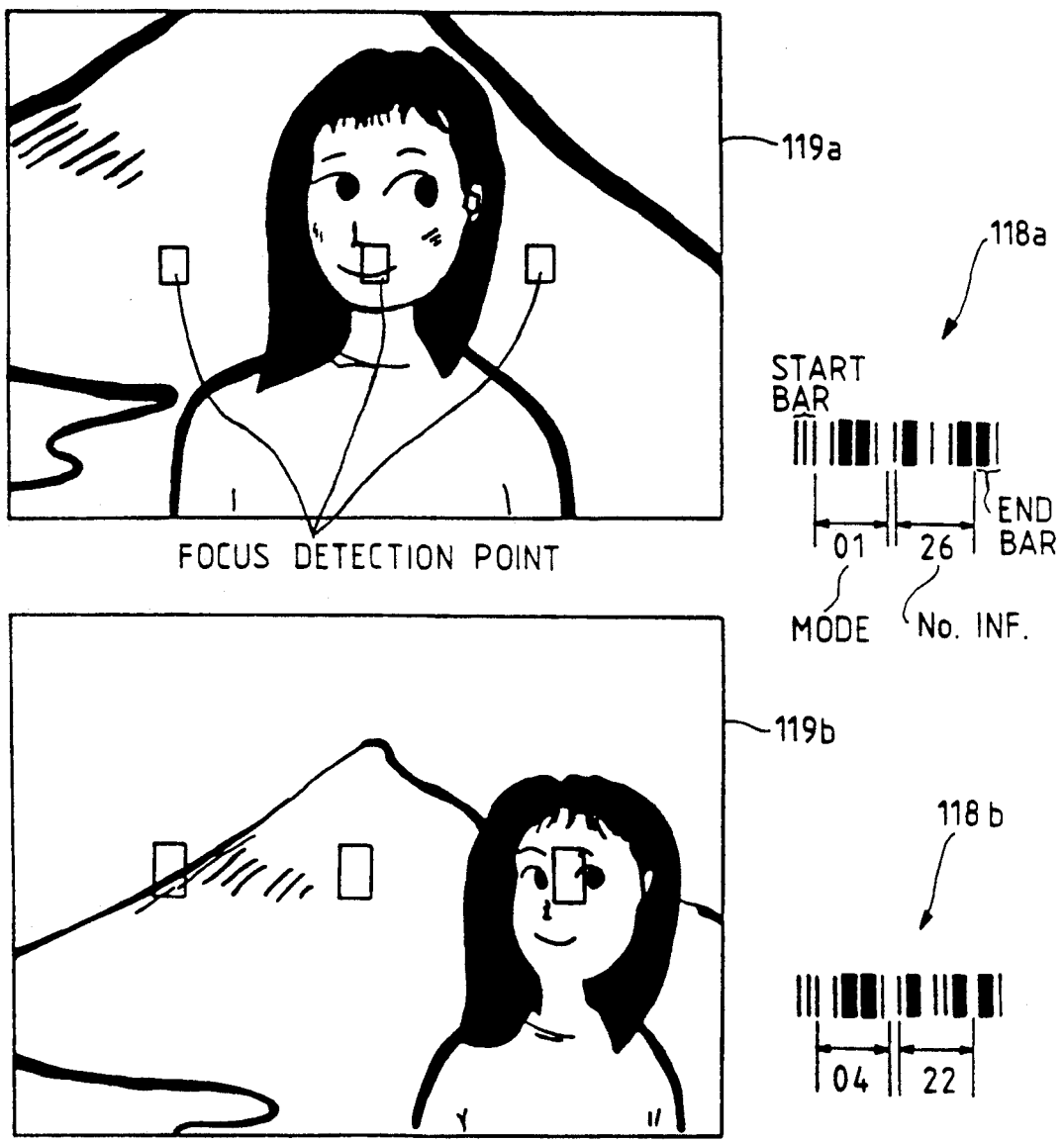

FIG. 13

| 1st. DIGIT | (1) |
|---|---|
| 0 | ONE-SHOT AF, SINGLE (CENTER PRIORITY) |
| 1 | ONE-SHOT AF, CONTINUOUS (CENTER PRIORITY) |
| 2 | SERVO AF, SINGLE (CENTER PRIORITY) |
| 3 | SERVO AF, CONTINUOUS (CENTER PRIORITY) |
| 4 | ONE-SHOT AF, SINGLE (PARTIAL) |
| 5 | ONE-SHOT AF, CONTINUOUS (PARTIAL) |
| 6 | SERVO AF, SINGLE (PARTIAL) |
| 7 | SERVO AF, CONTINUOUS (PARTIAL) |

| 2nd. DIGIT | (2) |
|---|---|
| 1 | SELECT CENTER FOCUS DETECTION POINT |
| 2 | SELECT LEFT FOCUS DETECTION POINT |
| 3 | SELECT CENTER AND LEFT FOCUS DETECTION POINT |
| 4 | SELECT RIGHT FOCUS DETECTION POINT |
| 5 | SELECT CENTER AND RIGHT FOCUS DETECTION POINT |
| 6 | SELECT RIGHT AND LEFT FOCUS DETECTION POINT |
| 7 | SELECT ALL FOCUS DETECTION POINTS |

| 3rd. DIGIT | (3) |
|---|---|
| 0 | PROGRAM |
| 1 | TV PRIORITY |
| 2 | AV PRIORITY |
| 3 | FLASH PROGRAM |

| 4th. DIGIT | AV | TV | EXPOSURE COMPENSATION |
|---|---|---|---|
| 0 | 22 | 30sec | 0 |
| 1 | 16 | 15sec | +½ |
| 2 | 11 | 4sec | +1 |
| 3 | 8.0 | 1sec | +1½ |
| 4 | 5.6 | 1/4sec | +2 |
| 5 | 4.0 | 1/15sec | +2½ |
| 6 | 2.8 | 1/60sec | -2 |
| 7 | 2.0 | 1/250sec | -1½ |
| 8 | 1.4 | 1/1000sec | -1 |
| 9 | 1.0 | 1/4000sec | -½ |

CAMERA

This is a continuation-in-part application of U.S. Ser. No. 07/633,115 filed Dec. 24, 1990, by Jiro Kazumi, now U.S. Pat. No. 5,097,283.

BACKGROUND OF THE INVENTION

Field of the Invention

This invention relates to a camera which effects control on the basis of a transmitted signal from information reading and supplying means.

Related Background Art

Heretofore, in program AE, the shutter speed and the aperture value have corresponded one to one to an EV value. However, depending on the purpose of photographing or the object to be photographed, it is sometimes desirable to choose a particular shutter speed (or aperture value). Therefore, there has been proposed a camera having a plurality of program lines and used with the program lines changed over.

However, depending on the purpose of photographing, it has sometimes been difficult to judge which of the program lines should be chosen. For example, when a close-up photograph of flowers is to be taken, if the photograph is directed to the use as a record, it is desirable to stop down the lens as much as possible and make the depth of field deep, and if the photograph is directed to the expression of the beauty of the flowers, it is often desirable to make the depth of field shallow. To judge this, it is necessary to know what effect the aperture has on the photograph.

Further, the prior-art camera has a wide variety of program lines and therefore need to have indicating means and input means for the change-over of the program lines, and this has led to the problem that the indication and operation become more complicated than in the case of a single program.

Also, there are the AF mode and the feed mode as what the photographer sets in photographing, but depending on the purpose of photographing, the photographer must know which of these modes should be chosen.

SUMMARY OF THE INVENTION

One aspect of this invention is to provide a camera in which a plurality of camera operations including AE and feeding are set on the basis of the signal of information reading and supplying means and therefore which enable the photographer to easily accomplish photographing fit for the object to be photographed or the purpose of photographing even if the photographer has no knowledge or experience about photographing.

DESCRIPTION OF THE DRAWINGS

FIGS. 5 to 7 are flowcharts.

FIG. 10 shows examples of photographs and bar codes according to the second embodiment.

FIG. 13 illustrates the contents of the bar code.

DESCRIPTION OF THE PREFERRED EMBODIMENTS

Figure 1A:
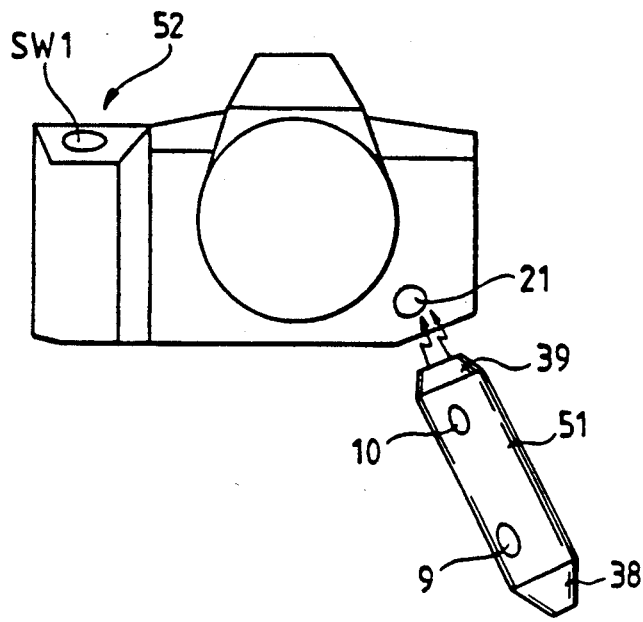
FIGS. 1A and 1B are pictorial views of a camera body and a code reading and supplying apparatus according to a first embodiment of the present invention.
Figure 1B:
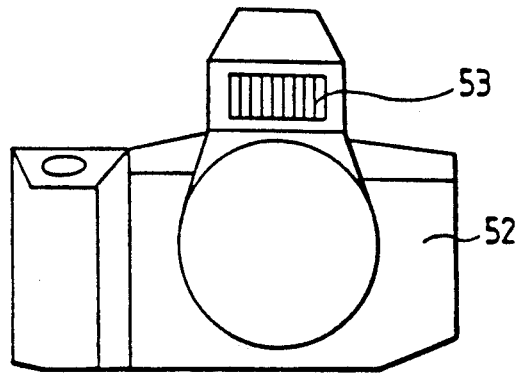

FIGS. 1A and 1B are pictorial views of a camera body 52 and a code reading and supplying apparatus 51 according to an embodiment of the present invention. FIG. 1A shows a state in which bar code information read by the code reading and supplying apparatus 51 is being transmitted as a light signal to the light receiving portion 21 of the camera body 52, and FIG. 1B shows a state in which a flash unit 53 contained in the camera body 52 is automatically popped up. In these figures, the reference character SW1 designates a release button, the reference numerals 9 and 10 denote switches, the reference numeral 38 designates a code reading portion, and the reference numeral 39 denotes a light signal transmitting portion.

Figure 2:
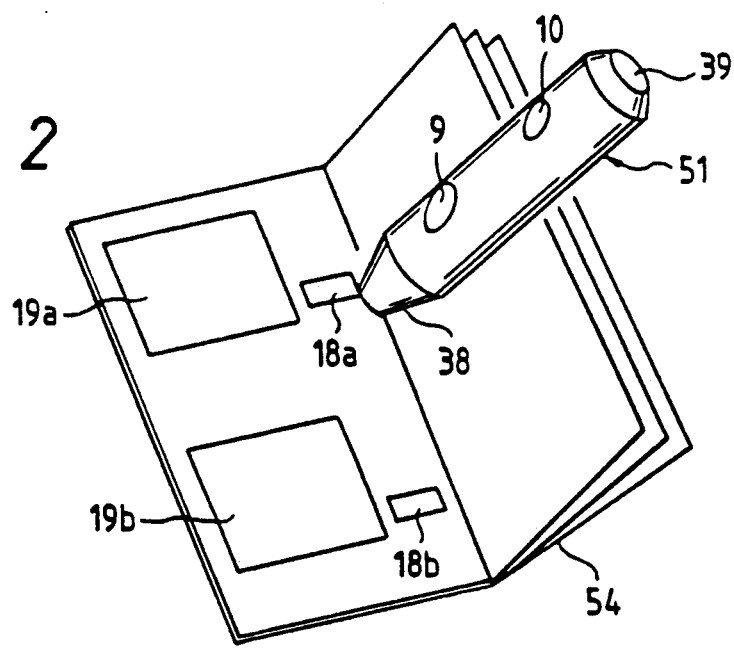
FIG. 2 is an illustration showing a state in which a bar code list used is being read by the code reading and supplying apparatus.

FIG. 2 shows a state in which a bar code list 54 used in the present embodiment is being read by the code reading apparatus 51 shown in FIG. 1A. On the bar code list 54, there are printed photographs 19a and 19b which are examples and bar code portions 18a and 18b corresponding to the photographs 19a and 19b, respectively. In FIG. 2, there is shown a state in which the reading operation is being performed with the bar code portion 18a traced by the code reading portion 38 of the code reading and supplying apparatus 51.

Figure 3:
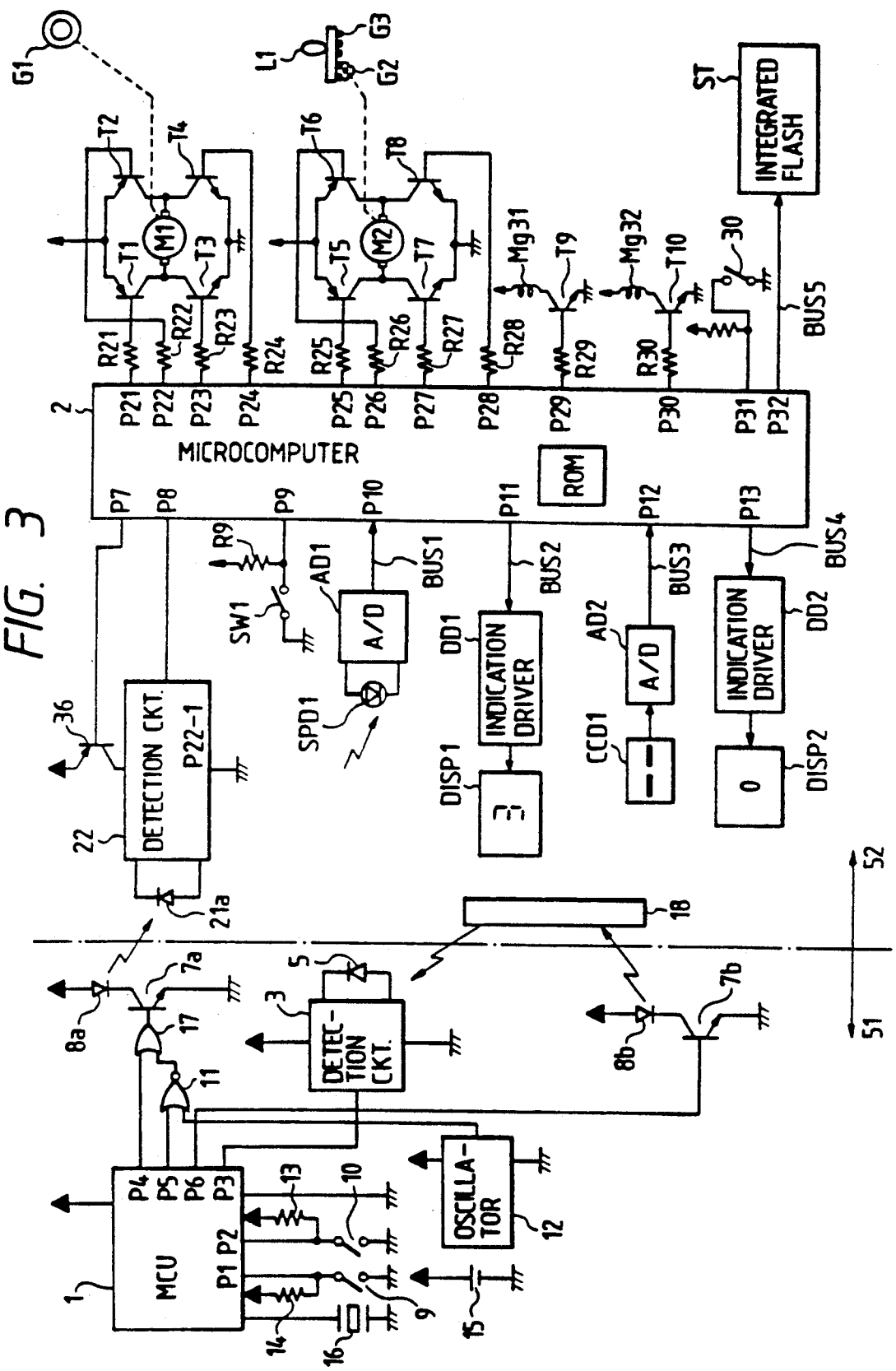
FIG. 3 is a diagram showing the circuit construction of the first embodiment.

Referring to FIG. 3 which is a diagram showing the circuit construction according to the present embodiment, the reference numeral 51 designates the code reading and supplying apparatus and the reference numeral 52 denotes the camera body.

On the code reading and supplying apparatus 51 side, the reference numeral 1 designates a 1-chip microcomputer (hereinafter referred to as the microcomputer 1) which effects code reading and supply control. The microcomputer 1 is comprised of a CPU, a ROM, a RAM, an IO, a serial communication interface (hereinafter referred to as the SCI) and a timer. In the IO of the microcomputer 1, an input port P3 is connected to the output of a detection circuit 3 for effecting code detection which will be described later. Other input ports P1 and P2 are connected to switches 9 and 10, respectively, and these input ports are pulled up to a power source by resistors 13 and 14. The output port P4 of the IO of the microcomputer 1 is connected to one input of an OR circuit 17. The output port P5 of the SCI of the microcomputer 1 is connected to one input of a NOR circuit 11, and the other input of the NOR circuit 11 is connected to an oscillation circuit 12 of 38 KHz, the output of which provides the other input of the OR circuit 17, and the output of the OR circuit 16 is connected to the base of a transistor 7a which will be described later. Thus, the output from the output port P5 of the SCI is output as a signal modulated at 38 KHz.

An output port P6 controls the operation of a transistor 7b.

The reference numeral 5 designates a silicon photodiode (hereinafter referred to as the SPD) adapted to detect the reflected light from a code portion (hereinafter referred to as the bar code portion) 18 comprised of optically readable black bars and white spaces illuminated by light emitted from IRED 8b. The reference numeral 3 denotes a detection circuit having therein an amplifying portion for amplifying the signal level. The detection circuit 3 is adapted to detect the output of the SPD 5 and put out a low level if the, output of the SPD 5 is the space portion of the bar code portion 18, and put out a high level if the output of the SPD 5 is the bar portion. The collector sides of the transistors 7a and 7b are connected to IREDs 8a and 8b, respectively. The reference numeral 15 designates a power supply battery for supplying electric power to the MCU1, the detection circuit 3, the IRED 4 and the IREDs 8a and 8b. The reference numeral 16 denotes a sound producing member for displaying that code reading has been properly effected.

On the camera 52 side, the reference numeral 2 designates a microcomputer which effects the control of the camera. The microcomputer 2, like the microcomputer 1, is comprised of a CPU, a ROM, a RAM, an IO and an SCI. The reference character 21a denotes an SPD constructed in the light receiving portion 21 (see FIG. 1A) so as to receive infrared light emitted from the IRED 8a. The SPD 21a is connected to a detection circuit 22, which is adapted to output a low level signal from an output port 22-1 only when there is a signal modulated at 38 KHz. The power source of the detection circuit 22 is switched by a transistor 36, the base of which is connected to the output port P7 of the microcomputer 2. The output port 22-1 is connected to the input port P8 of the SCI of the microcomputer 2.

P9 in the microcomputer 2 denotes an input port to which a low level signal is input by the release button SW1 of the camera shown in FIG. 1 being depressed, SPD1 designates a silicon photodiode for effecting the light metering operation, AD1 denotes an AD converter for converting the signal of the silicon photodiode SPD1 which is an analog value into a digital value and transmitting it to the microcomputer 2, BUS1 designates a bus line for the transmission thereof, and P10 denotes an input port for inputting the AD-converted value.

DD1 designates an indication driving circuit for driving a display device DISP1, P11 denotes an output port for sending a signal to the indication driving circuit DD1, and BUS2 designates a bus line for the transmission thereof. CCD1 denotes a line sensor for distance measurement, AD2 designates an AD converter for converting the signal of the line sensor CCD1 which is an analog value into a digital value and transmitting it to the microcomputer 2, BUS3 denotes a bus line for the transmission thereof, and P12 designates an input port for inputting the AD-converted value. DISP2 denotes a display device for displaying the state of focusing displayed within the viewfinder of the camera, DD2 designates an indication driving circuit for driving the display device DISP2, P13 denotes an output port for, sending a signal to the indication driving circuit DD2, and BUS4 designates a bus line for the transmission thereof.

M1 denotes a motor for feeding film. The collector of a PNP transistor T1 and the collector of an NPN transistor T3 are connected to one end of the motor M1, and the collector of a PNP transistor T2 and the collector of an NPN transistor T4 are connected to the other end of the motor M1. The emitters of the PNP transistors T1 and T2 are connected to the + (plus) side of the source voltage, and the emitters of the NPN transistors T3 and T4 are connected to the − (minus) side of the source voltage. The bases of the PNP transistors T1 and T2 are connected to the output ports P21 and P22, respectively, of the microcomputer 2 through base resistors R21 and R22, respectively, and the bases of the NPN transistors T3 and T4 are connected to the output ports P23 and P24, respectively, of the microcomputer 2 through base resistors R23 and R24, respectively. As will be seen from such construction, when the transistors T1 and T4 are in their conductive state, an electric current flows from left to right in the motor M1 as viewed in FIG. 3 and the motor M1 rotates clockwise to effect the winding-up of the film and shutter charge, and when the transistors T2 and T3 are in their, conductive state, an electric current flows from right to left in the motor M1 as viewed in FIG. 3 and the motor M1 rotates counter-clockwise to effect the rewinding of the film. The motor M1 operates in operative association with a spool G1 for this.

M2 designates a motor for moving a focusing optical system L1 back and forth. The collector of a PNP transistor T5 and the collector of an NPN transistor T7 are connected to one end of the motor M2, and the collector of a PNP transistor T6 and the collector of an NPN transistor T8 are connected to the other end of the motor M2. The emitters of the PNP transistors T5 and T6 are connected to the + (plus) side of the source voltage, and the emitters of the NPN transistors T7 and T8 are connected to the − (minus) side of the source voltage. The bases of the PNP transistors T5 and T6 are connected to the output ports P25 and P26, respectively, of the microcomputer 1 through base resistors R25 and R26, respectively, and the bases of the NPN transistors T7 and T8 are connected to the output ports P27 and P28, respectively, of the microcomputer 2 through base resistors R27 and R28, respectively. When the transistors T5 and T8 are in their conductive state, an electric current flows from left to right in the motor M2 and the motor M2 rotates clockwise to axially outwardly move the focusing optical, system L1 through a pinion gear G2 and a rack G3. When the transistors T6 and T7 are in their conductive state, an electric current flows from right to left in the motor M2 and the motor M2 rotates counter-clockwise to axially inwardly move the focusing optical system L1 through the pinion gear G2 and the rack G3.

An NPN transistor T9 is a switching transistor having its emitter grounded and its collector connected to the + (plus) side of the source voltage through a magnet coil Mg31. The base of the transistor T9 is connected to the output port P29 of the microcomputer 2 through a resistor R29. When the transistor T9 is rendered conductive, the magnet coil Mg31 is electrically energized and the forward curtain of a shutter, not shown, is moved. Likewise, an NPN transistor T10 is a switching transistor having its emitter grounded and its collector connected to the + (plus) side of the source voltage through a magnet coil Mg32. The base of the transistor T10 is connected to the output port P30 of the microcomputer 2 through a resistor R30. When the transistor T10 is rendered conductive, the magnet coil Mg32 is electrically energized and the rearward curtain of the shutter, not shown, is moved.

ST designates an integrated flash unit movably supported in the contained state of FIG. 1A and the popped-up state of FIG. 1B at the vertex position of a pentaprism. BUS5 denotes a bus line for the integrated flash unit ST.

The reference numeral 30 designates a switch adapted to be closed when bar code information is received from the code reading and supplying apparatus 51. The switch 30 is designed to be closed, for example, by a light signal transmitting portion 39 being urged against the light receiving portion 21 of the camera 52.

The format of the bar code portion 18 will now be described.

The bar code of the bar code portion 18 is comprised of thin lines (hereinafter called narrow bars), thick lines (hereinafter called wide bars), narrow intervals between the bars (hereinafter called narrow spaces) and wide intervals between the bars (hereinafter called wide spaces), and "0" is made to correspond to the narrow bars and the narrow spaces, and "1" is made to correspond to the wide bars and the wide spaces. The ratio between the widths of the narrow spaces and the narrow bars is 1:1, and the ratio between the widths of the narrow bars and the wide bars is 1:3. The bar code portion 18 (18a, 18b) is shown in FIG. 4.

As shown in FIG. 4, the bar code always begins with a combination (called the start bar) of two narrow bars and a narrow space, and ends, with a narrow space (called the end bar) sandwiched between a wide bar and a narrow bar. Data are written between the start bar and the end bar, and these data are written with five bars and five spaces corresponding thereto as a unit, and it is to be understood that the respective data express one-figure numbers.

Figure 4A:
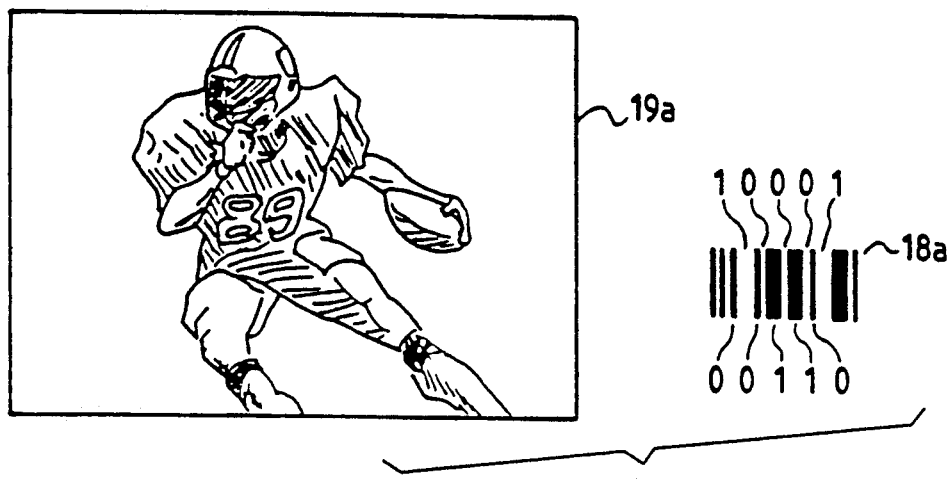
FIGS. 4A and 4B are enlarged views of the bar code list.
Figure 4B:
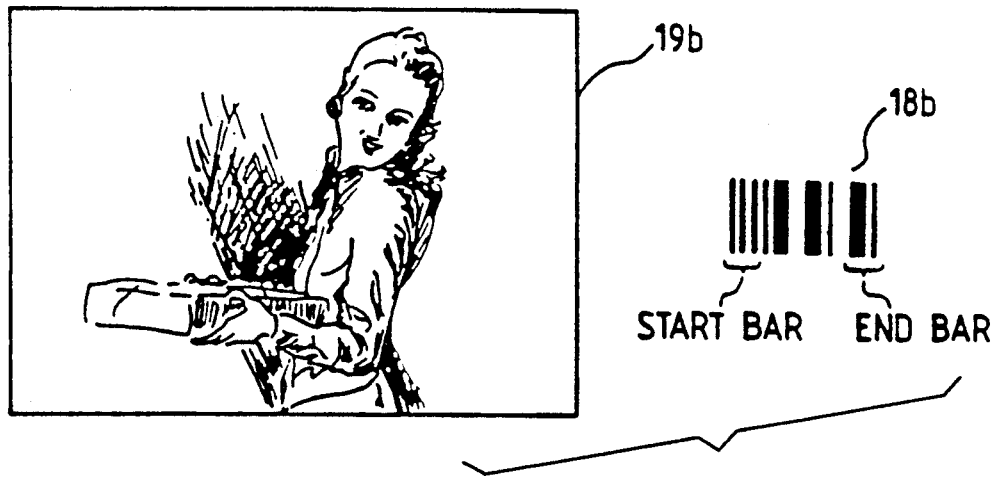

For example, in the bar code portion 18a shown in FIG. 4, in subsequence to the start bar, "00110" is indicated by the bars with the narrow bars as "0" and the wide bars as "1", and likewise in the space, "10001" is indicated. Accordingly, it will be seen that the bar code portion 18a of FIG. 4A is a (decimal) bar code showing e.g. "03" and in the same manner, the bar code portion 18b of FIG. 4B is a bar code showing e.g. "04".

Figure 5B:
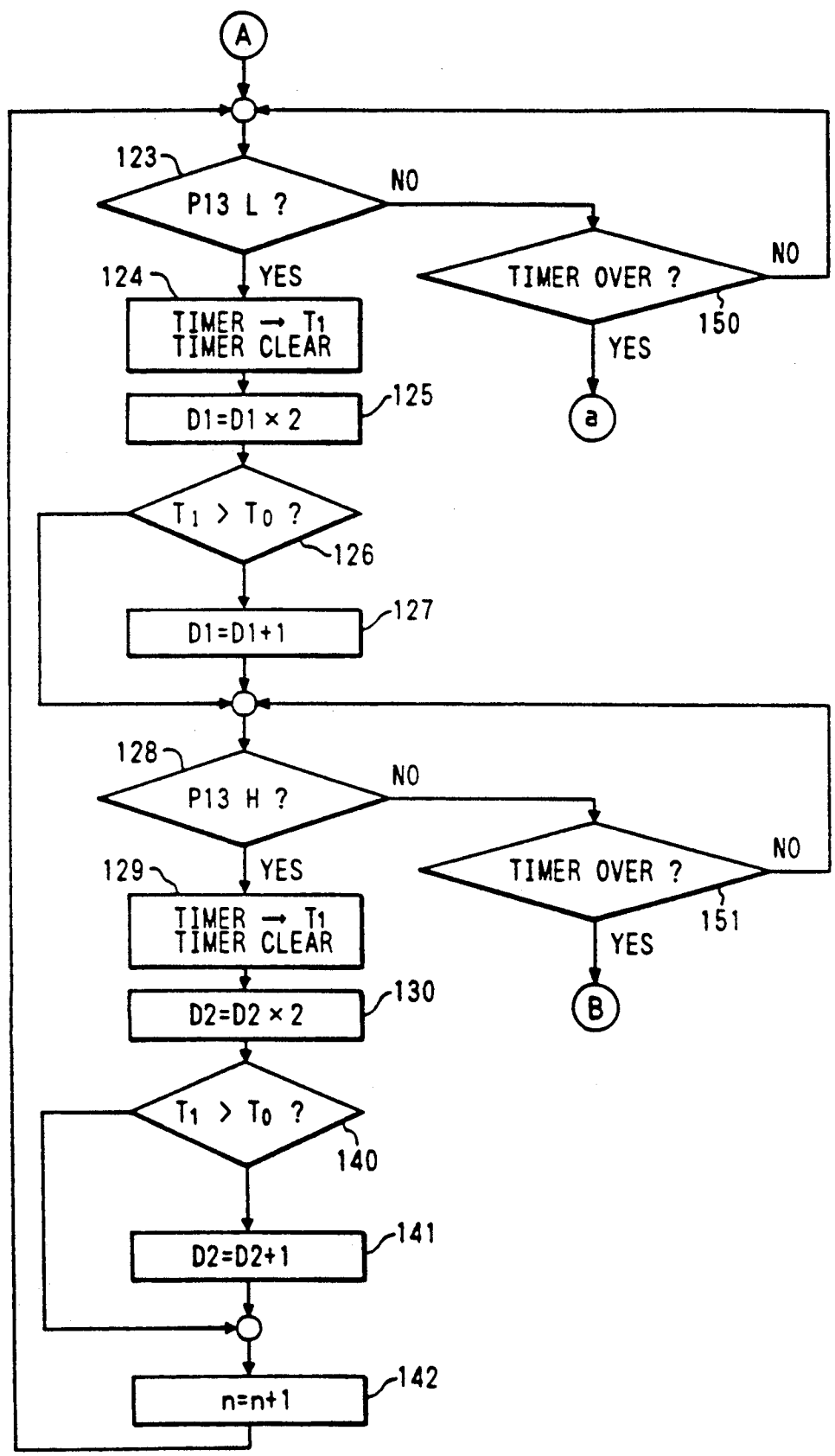

The bar code reading operation will now be described with reference to the flowchart of FIG. 5.

As previously described, when the output of the detection circuit 3, i.e., the input to the input port P3 of the microcomputer 1, is at a high level, the bar code portion 18 is in the state of bar, and when the output of the detection circuit 3 is at a low level, the bar code portion 18 is in the state of space.

Six registers T0, T1, T2, n, D1 and, D2 are prepared in the RAM in the microcomputer 1.

First, at a step 100, it is waited for the first bar to be found out, and at steps 101-103, the time of the first narrow bar is measured, and at steps 104 to 106, the time of the narrow space is measured, and at steps 107 to 109, the time of the next narrow bar is measured, and 1.5 times the maximum value thereof is used as a time T0 to be used to judge whether the bar is narrow or wide.

When the measurement of the time T0 by the start bar is terminated, at a step 121, a register for data is cleared and the reading of data is started.

At steps 123 and 124, the time of the bar is read and if it is greater than the time T0, it is judged to be "1", and the data is doubled and "1" is added thereto. In the other cases, doubling alone is effected. At steps 128 and 129, the time of the space is read and if likewise, it is greater than the time T0, it is judged to be "1" and a similar operation is performed.

Each time one set of bar and space is read, the register n is incremented and the reading of the bar and the space is repeated.

At steps 150 and 151, the overflow of a timer is detected. If there is the overflow, it is judged that the reading of the bar code has been terminated. If at the step 150, there is the overflow, it is judged to be an error and again, (a), i.e., the operation from the step 100, is performed. If at the step 151, there is the overflow, whether the termination is normal is checked up by the number of bars first at a step 152, and then at steps 153 and 54, the end bar is checked up, and if the result is NG (the termination is not normal), it is judged to be an error and again, the operation from (a) is performed. If the termination is judged to be normal, the display to that effect is done by the sound producing member 16.

Description will now be made of the reading of the bar code portion 18a corresponding to the photograph 19a. To effect the reading of the bar code, the bar code portion 18a is traced by the reading portion 38 while the switch 9 is depressed. When the switch 9 is depressed, the microcomputer 1 renders the output port P6 into a high level and therefore, the transistor 7b is rendered conductive and the IRED 8b is turned on.

At the same time, the microcomputer 1 effects the reading of the bar code. Here, the bar code portion 18a expresses "03" (decimal) and therefore, the value thereof is read and once stored in the internal RAM. When the switch 9 is opened, the microcomputer 1 renders the output port P6 into a low level.

Description will now be made of a case where the data retained in said internal RAM is transmitted to the camera body 52.

The light signal transmitting portion 39 is urged against the light receiving portion 21 of the camera body 52.

When the switch 30 is closed and the input port P31 assumes a low level, the microcomputer 2 outputs a low level to the output port P7 and renders the transistor 36 conductive. By the transistor 36 being thus rendered conductive, electric power is supplied to the detection circuit 22, which thus becomes able to receive a signal.

When the switch 10 of the code reading and supplying apparatus 51 side is then depressed, the microcomputer 1 outputs from the SCI (the output port P5) binary data "00000011" resulting from "03" being converted into BCD code.

This output is modulated at 38 KHz by the NOR circuit 11, renders the transistor 7a conductive and turns on the IRED 8a. The data (infrared light) emitted from the IRED 8a is detected by the SPD 21a disposed in the camera 52, is demodulated by the detection circuit 22 and is input to the SCI of the microcomputer 2. Thus, the microcomputer 2 has received data "00000011", i.e., hexadecimal, data "03".

The microcomputer 2 stores this data "03" in a portion of the RAM therein.

The operation of the microcomputer 2 of the camera side will now be described with reference to the flowchart of FIGS. 6 and 7.

Step 1

Whether the camera body 52 has been operated into a mode in which the inputting of bar code information is possible, i.e., the bar-code mode, is examined. Various specific examples of the change-over operation to the bar-code mode would occur to mind, but the change-over by a rotary switch, for example, is desirable, because the photographer can always visually observe the change-over state of mode.

At the step 1, advance is made to a step 2 only when the camera is in the bar-code mode.

Step 2

The bar code information setting sub-routine shown in FIG. 7 is executed.

Step 21

The content of a flag B representing whether bar code information has been previously input is examined. If the flag B is not "1" (B≠1), it means that the setting of exposure control by the bar code information has never been effected. If the, flag B is "1" (B=1), it means that the setting of exposure control by the bar code information has been effected at least once.

If the flag B is "1", advance is made to a step 22, and if the flag B is not "1", advance is made to a step 23.

Step 22

Set data including the exposure control data by the former bar code information is read out from EEPROM.

Step 23

Set data including the initial exposure control data is read out from EEPROM.

The initial set data is the normal program shown in a step 11 which will be described later.

Step 24

The set data is written into the register of the microcomputer 2.

Step 25

Display expressing the set data which can now be executed is effected on the display device DISP1 (see FIG. 3). This display is carried out, for example, by the use of "numerals", "alphabet", etc.

Step 26

Whether the reading of the bar code information by the light receiving portion 21 is possible is judged. That is, the code reading, and supplying apparatus 51 is urged against the light receiving portion 21 to examine whether the switch 30 is ON. If the switch 30 is ON, advance is made to a step 27, and if the switch 30 is OFF, it is waited for the switch 30 to be ON. At this step 26, the state of the switch 30 is examined to judge not only whether advance can be made to the next step 27, but also judge the following conditions.

Firstly, when the release operation is going on, even if the switch 30 is ON, advance cannot be made to the step 27. This means that actually for the purpose of photographing, in a single-lens reflex camera, the reading of new bar code information is not effected in order to prevent malfunctioning during the release operation in which there occur the movement of the main mirror and sub-mirror to their retracted positions for photographing, the operation of the diaphragm, the operation of the shutter, the return of the main mirror and sub-mirror to their initial positions, etc.

Secondly, during the feeding (winding-up and rewinding) of the film, advance cannot be made to the step 27 even if the switch 30 is ON. This means that during the operation of the motor M1, i.e., during the winding-up and rewinding of the film, the meaningless reading of new bar code information is not effected.

Besides these, when the mode is being changed over and when the mode has been changed over from the bar code mode to other mode, reading is not effected.

Step 27

The detection circuit 22 is rendered operative and the reading of the bar code information by the SPD 21a is effected.

Step 28

Whether the light signal input from the SPD 1a coincides with preset definitions (the presence of the start bar and the end bar, the length of message, etc.) is judged, and if the former coincides with the latter, advance is made to a step 29, and if the former does not coincide with the latter, return is made to the step 26.

The operation up to these steps 26–28 is made effective for a predetermined time for the purpose of lengthening the life of the integrated battery.

Step 29

Set data corresponding to newly read bar code information is written into the register. Consequently, the set data so far written (the former set data or the initial set data) is erased.

Step 30

If the flag B representing whether the bar code information has been previously input, is not "1", the flag B is changed to "1" at this step.

Figure 6:
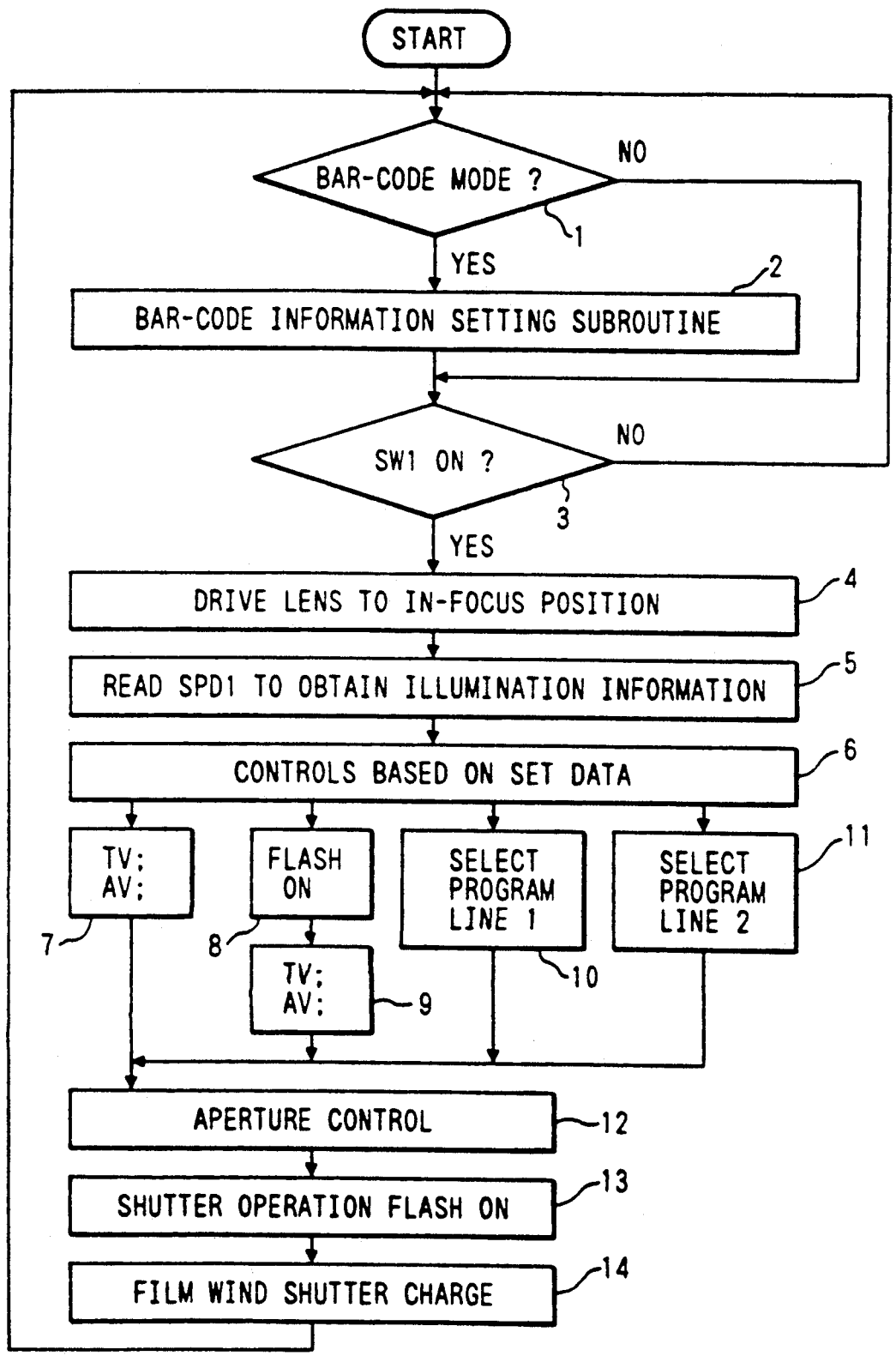

Return is then made to the main flow, and advance is made to the step 3 of FIG. 6. When the release button SW1 is depressed at the step 3 and advance is made to the release operation even if the reading operation by the step 27 is not performed, return is made to the main flow.

Step 3

Whether the release button SW1 is depressed is discriminated through the input port P9, and if the release button is depressed, advance is made to a step 4, and if not so, return is made to the step 1.

Step 4

Signal outputting is effected from the output ports P25, P26, P27 and P28, and the focusing optical system L1 is moved back and forth and moved to the in-focus position.

Then, data for effecting the in-focus display is output from the output port P13 to the indication driving circuit DD2 through the bus line BUS4.

Step 5

The illumination information output from the silicon photodiode SPD1 is read from the input port P10 through the bus line BUS1 and light metering calculation is effected.

Step 6

The actual operation program is executed, on the basis of the set data written into the register at the step 29 or the set data written into the register at the step 24.

Steps 7-11

Steps 7-11 show four kinds of exposure controls which can be executed (selected) by the bar code information.

Step 7 shows the first exposure control flow in which the shutter time and the aperture value are set irrespective of the photometric value.

Steps 8 and 9 show the second exposure control flow for nighttime photographing. At the step 8, the integrated flash unit 53 (ST) is automatically popped up and the charging of the main capacitor for flashing is effected by the output of the output port P32, and at the step 9, the shutter time is made equal to the flash tuning time and also, the exposure control by a preset aperture value (from the photograph 19 shown in FIG. 4, the aperture value is determined with the distance of the main object as a preset distance) is provided.

Step 10 shows the third exposure control flow suitable for the sports photographing shown in FIG. 4A. The shutter time is set to a high speed (e.g. 1/500 sec.), the aperture is found from the illumination information by calculation, and as regards the auto-focusing, the servo mode is provided in which the auto-focusing operation is continued even after the in-focus, and as regards the film winding-up, each port is controlled so that continuous photographing may be provided.

Step 11 shows the fourth exposure control flow suitable for the normal photographing shown in FIG. 4B, and the aperture value and the shutter time are found from the illumination information by calculation, and as regards the auto-focusing, the one-shot mode is provided in which the auto-focusing operation after the first focusing is inhibited, and as regards the film winding-up, each port is controlled so that single-shot photographing may be provided.

Step 12

The aperture is stopped down to the aperture value found by any of the steps 7-11.

Step 13

A high signal is first output from the output port P30 so as to provide the shutter time found also by any of the steps 7-11, whereby the NPN transistor T9 is rendered conductive to electrically energize the magnet Mg31 and effect the movement of the forward shutter curtain, and after a predetermined shutter time, a high signal is output from the output port P31 to render the NPN transistor T10 conductive and thereby electrically energize the magnet Mg32 and effect the movement of the rearward shutter curtain.

When the steps 8 and 9 have been selected, the integrated flash unit 53 (ST) is caused to emit light upon completion of the movement of the forward shutter curtain.

Step 14

The transistors T1 and T4 are rendered conductive by the output ports P21, P22, P23 and P24 to thereby rotate the motor M1 and effect the winding-up of the film and shutter charge.

Figure 8B:
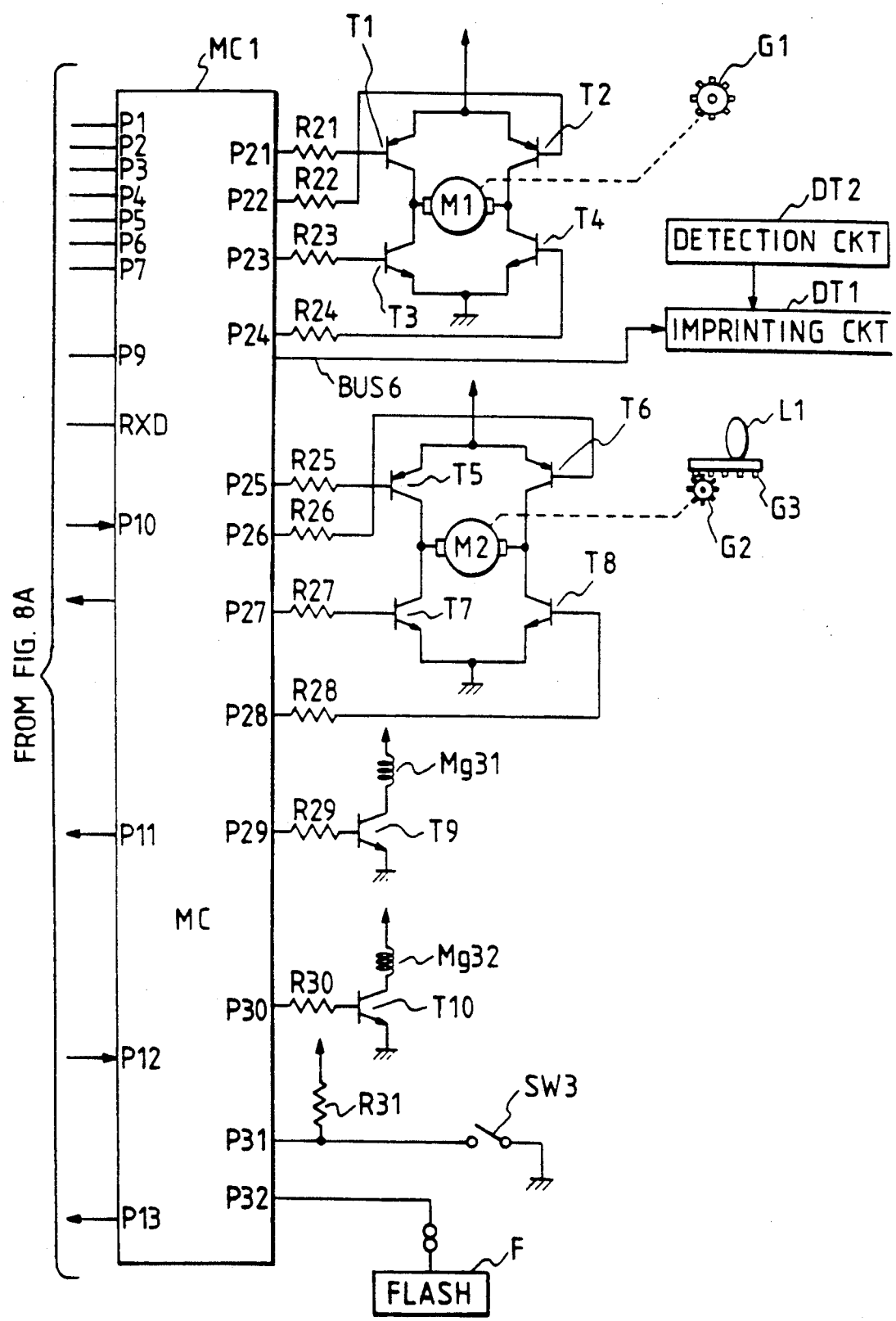
FIG. 8 is a block diagram of a second embodiment of the present invention.

Referring to FIG. 8 which is a block diagram showing a second embodiment of the present invention, the reference numeral 151 designates a code reading and supplying apparatus, and the reference numeral 152 denotes a camera body.

On the code reading and supplying apparatus 51 side, the reference numeral 101 designate a 1-chip microcomputer (hereinafter referred to as the MCU) which effects code reading control and which is comprised of a CPU, an ROM, an RAM, IO, a serial communication interface (hereinafter referred to as the SCI) and a timer. Of the IO of the MPU 101, an input port P13 is connected to the output of a code detection circuit 103. Other input ports P11 and P12 are connected to switches 109 and 110, and these input ports are pulled up to a power source by resistors 113 and 114. The output port P21 of the IO of the MCU 101 is connected to the base of a transistor 106. The output port P22 of the SCI of the MCU 101 is connected to the input of an inverter circuit 111, and the output thereof is connected to the base of a transistor 107. The collector of the transistor 106 is connected to an infrared light emitting diode (hereinafter referred to as the IRED) 104. The reference numeral 105 denotes a silicon photodiode (hereinafter referred to as the SPD) adapted to detect the reflected light from a code portion (hereinafter referred to as the bar code portion) 118 comprised of optically readable black bars and white spaces illuminated by the light emitted from the IRED 104. The detection circuit 103 is designed to detect the output of the SPD 105, and output a low level if the output is from the space portion of the bar code portion 118, and output a high level if the output is from the bar portion of the bar code portion 118. The collector of the transistor 107 is connected to the IRED 108. The reference numeral 115 designates a power supply battery for supplying a power source to the MCU 101, the detection circuit 103, the IRED 104, IRED 108, etc., and the reference numeral 116 denotes a buzzer for indicating that reading has been done accurately.

The SCI of the MCU 101 is designed to output a non-synchronous type signal of 8 character length bits, 2 stop bits and 1 start bit.

On the camera body 152 side, MC1 designates a microcomputer for effecting the operation control of the camera, SW2 denotes a rotary switch rotatable with the rotation of a dial DIAL1 shown in FIG. 8, and ports P1, P2, P3, P4, P5, P6 and P7 are input ports, one of which becomes ON by the rotation of the DIAL1 and the others become OFF. R1, R2, R3, R4, R5 and R7 designate pull-up resistors. P9 denotes an input port corresponding to the release button SW1 of the camera shown in FIGS. 8 and 9. The input port P9 receives a low signal as an input by the release button SW1 of the camera being depressed.

SPD1 and SPD2 designate silicon photodiodes for performing the photometric operation. The SPD1 is designed to effect the photometry of center priority, and the SPD2 is designed to effect the photometry of a portion. AD1 denotes an AD converter for converting the signals of the silicon photodiodes SPD1 and SPD2 which are analog values into digital values and transmitting these signals to the microcomputer MC1, BUS1 designates a bus line for the transmission thereof, and P10 denotes an input port for inputting the AD-converted value.

DD1 designates an indication driving circuit for driving a display device DISP1, P11 denotes an output port for sending a signal to the indication driving circuit DD1, and BUS2 designates a bus line for the transmission thereof.

CCD1, CCD2 and CCD3 denote line sensors for focus detection which are designed to detect different focus detection points in a frame. CCD1 corresponds to the center focus detection point, and CCD2 and CCD3 correspond to left and right focus detection points, respectively. AD2 designates an AD converter for converting the signals of the line sensors CCD1, CCD2 and CCD3 which are analog values into digital values and transmitting them to the microcomputer MC1, BUS3 denotes a bus line for the transmission thereof, and P12 designates an input port for inputting the AD-converted values.

DISP2 denotes a display device indicated in the viewfinder or the like of the camera and displaying the state of focusing, DD2 designates an indication driving circuit for driving the display device DISP2, P13 denotes an output port for sending a signal to the indication driving circuit DD2, and BUS4 designates a bus line for the transmission thereof.

M1 denotes a motor for feeding film. The collector of a PNP transistor T1 and the collector of an NPN transistor T3 are connected to one end of the motor M1, and the collector of a PNP transistor T2 and the collector of an NPN transistor T4 are connected to the other end of the motor M1. The emitters of the PNP transistors T1 and T2 are connected to the + (plus) side of the source voltage, and the emitters of the NPN transistors T3 and T4 are connected to the − (minus) side of the source voltage.

Also, the bases of the PNP transistors T1 and T2 are connected to the output ports P21 and P22 of the microcomputer MC1 through base resistors R21 and R22, respectively, and the bases of the NPN transistors T3 and T4 are connected to the output ports P23 and P24 of the microcomputer MCU 101 through base resistors R23 and R24, respectively.

As can be seen from this construction, when the transistors T1 and T4 are in their conductive state, an electric current flows from left to right and the motor M1 rotates clockwise to effect the film feeding operation and shutter charge, and when the transistors T2 and T3 are in their conductive state, the electric current flows from right to left and the motor M1 rotates counterclockwise to effect the film rewinding operation. The motor M1 operates in association with a sprocket G1 therefor.

M2 designates a motor for moving a photo-taking optical system L1 in the direction of the optic axis thereof. The collector of a PNP transistor T5 and the collector of an NPP transistor T7 are connected to one end of the motor M2, and the collector of a PNP transistor T6 and the collector of an NPN transistor T8 are connected to the other end of the motor M2.

The emitters of the PNP transistors T5 and T6 are connected to the + (plus) side of the source voltage, and the emitters of the NPN transistors T7 and T8 are connected to the − (minus) side of the source voltage.

Also, the bases of the PNP transistors T5 and T6 are connected to the output ports P25 and P27 of the microcomputer MC1 through base resistors R25 and R27, respectively, and the bases of the NPN transistors T7 and T8 are connected to the output ports P27 and P28 of the microcomputer MC1 through base resistors R27 and R28, respectively.

When the transistors T5 and T8 are in their conductive state, the electric current flows from left to right and the motor M2 rotates clockwise to axially forwardly move the photo-taking lens L1 through a pinion gear G2 and a rack G3.

When the transistors T6 and T7 are in their conductive state, the electric current flows from right to left and the motor M2 rotates counterclockwise to axially backwardly move the phototaking optical system L2.

An NPN transistor T9 is a switching transistor, the emitter of which is grounded and the collector of which is connected to the + (plus) side of the source voltage through a magnet coil Mg31.

The base of this transistor is connected to the output port P30 of the microcomputer. When the transistor T9 is rendered conductive, the magnet coil Mg31 is electrically energized and the front curtain of the shutter is moved.

Likewise, an NPN transistor T10 is a switching transistor, the emitter of which is grounded and the collector of which is connected to the − (minus) side of the source voltage through a magnet coil Mg32. When the transistor T10 is rendered conductive, the magnet coil Mg32 is electrically energized and the rear curtain of the shutter is moved.

SW3 designates a switch adapted to be closed when a flash unit in FIG. 8 is used, and R31 denotes a pull-up resistor. The switch SW3 is connected to the input port P31 of the microcomputer MC1, so that the microcomputer MC1 can detect whether the flash unit has been mounted on the camera.

PTR denotes a phototransistor adapted to receive a signal from the IRED 108 of the reading and supplying apparatus 151. The collector of PTR is pulled up to the power source by a resistor R32 and is connected to the input port RXD of the SCI of the microcomputer MC1.

FL1 designates a D/A converter for converting the input of BUS5 into an analog value. FL2 denotes a photometry circuit for comparing the output of a silicon photodiode SPD2 installed so as to receive flashlight (usually disposed on the underside of a mirror box) with the analog output of the D/A converter FL1, and outputting a light emission stop signal to a flash circuit F by an output port 32. That is, the level of the quantity of flashlight can be regulated by the signal of BUS5 from the microcomputer MC1.

The code reading and supplying apparatus 151 is provided with two switches 109 and 110, and IRED 104 and SPD 105 which provide a code reading portion are incorporated in one end of this apparatus, and IRED 108 for data transmission is incorporated in the other end of this apparatus.

The camera body 152 is provided with a switch SW1 for effecting release and a data receiving portion PTR.

Photographs 119a and 119b corresponding to bar code portions 118a and 118b, respectively, are printed on the bar code list 53 so that the reading of the bar code may be accomplished by tracing the bar code portion 118 by the code reading portion.

The format of the bar code portion 118 will now be described.

The bar code of the bar code portion 118 is comprised of thin lines (hereinafter called narrow bars), thick lines (hereinafter called wide bars), narrow intervals between the bars (hereinafter called narrow spaces) and wide intervals between the bars (hereinafter called wide spaces), and "0" is made to correspond to the narrow bars and the narrow spaces, and "1" is made to correspond to the wide bars and the wide spaces. The ratio between the widths of the narrow spaces and the narrow bars is 1:1, and the ratio between the widths of the narrow bars and the wide bars is 1:3. The bar code portion 118 (118a, 118b) is shown in FIG. 10.

Figures 9, 11:
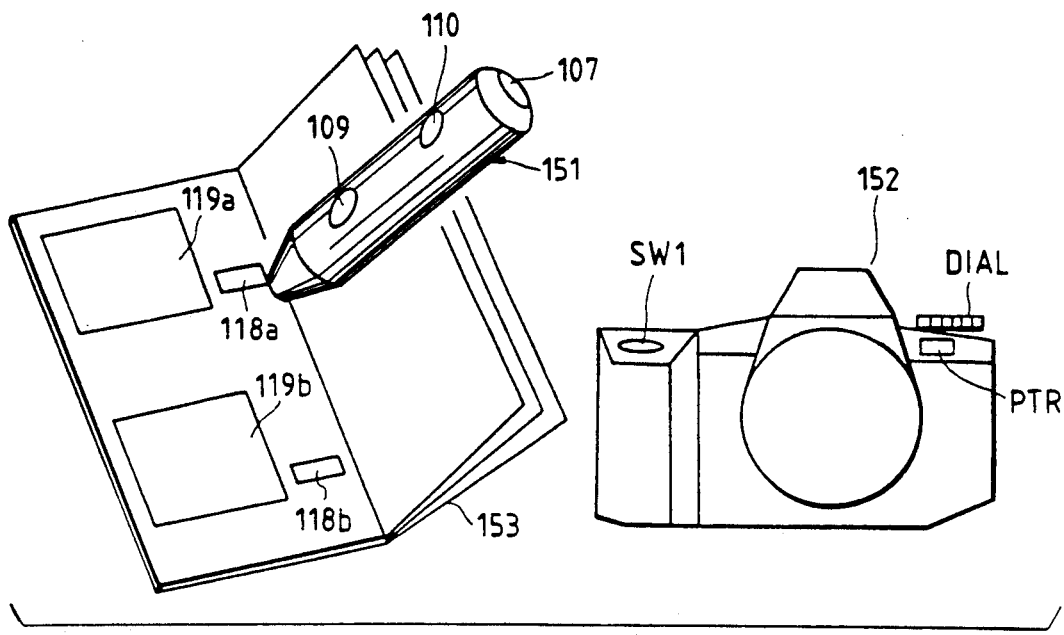
FIG. 9 is a pictorial view of a camera system according to the second embodiment.
FIG. 11 shows the format of a bar code.

As shown in FIG. 10, the bar code always begins with a combination (called the start bar) of two narrow bars and a narrow space, and ends with a narrow space (called the end bar) sandwiched between a wide bar and a narrow bar. Data are written between the start bar and the end bar, and these data are written with five bars and five spaces corresponding thereto as a unit, and it is to be understood that the respective data express one-figure numbers. The order of arrangement of "0" and "1" and the relation between the numbers represented thereby are shown in FIG. 11.

For example, in the bar code portion 118a shown in FIG. 10, in subsequence to the start bar, "00110" and "01001" are indicated by the bars with the narrow bars as "0" and the wide bars as "1", and likewise in the space, "10001" and "01001" are indicated. Accordingly, it will be seen from FIG. 11 that the bar code portion 118a of FIG. 10 is a (decimal) bar code showing "01" and "26" and in the same manner, the bar code portion 118b of FIG. 10 is a bar code showing "04" and "22".

Figures 12, 12A:
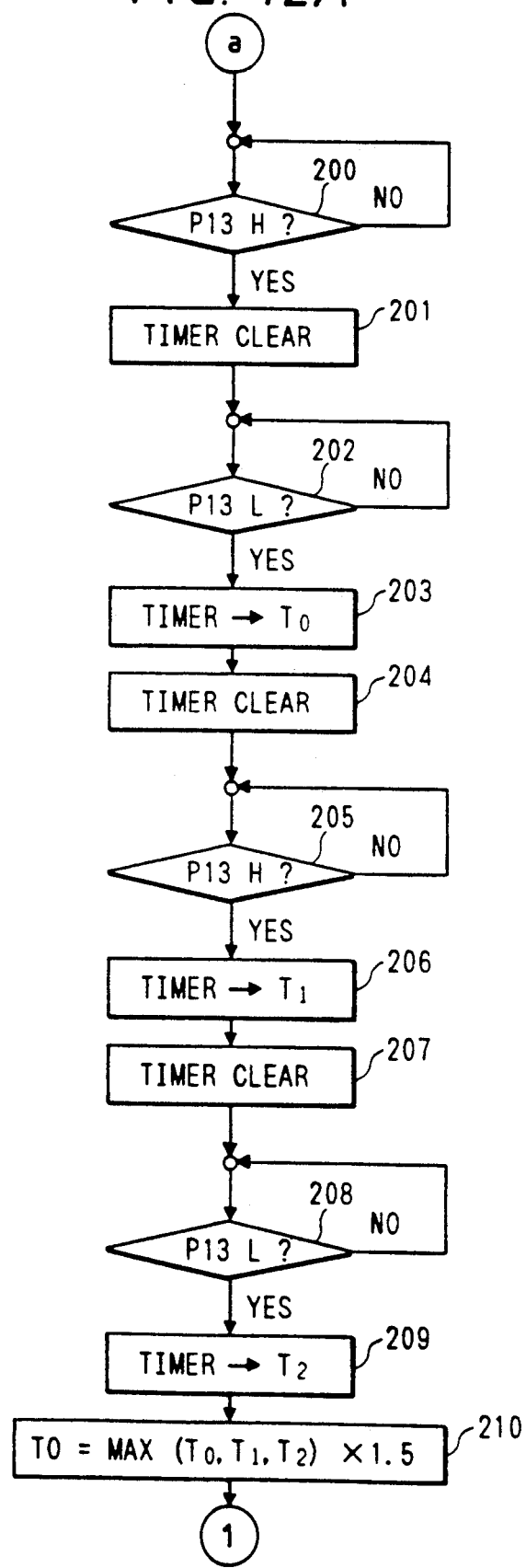
FIG. 12 is a flowchart showing the reading of the bar code.
Figure 12B:
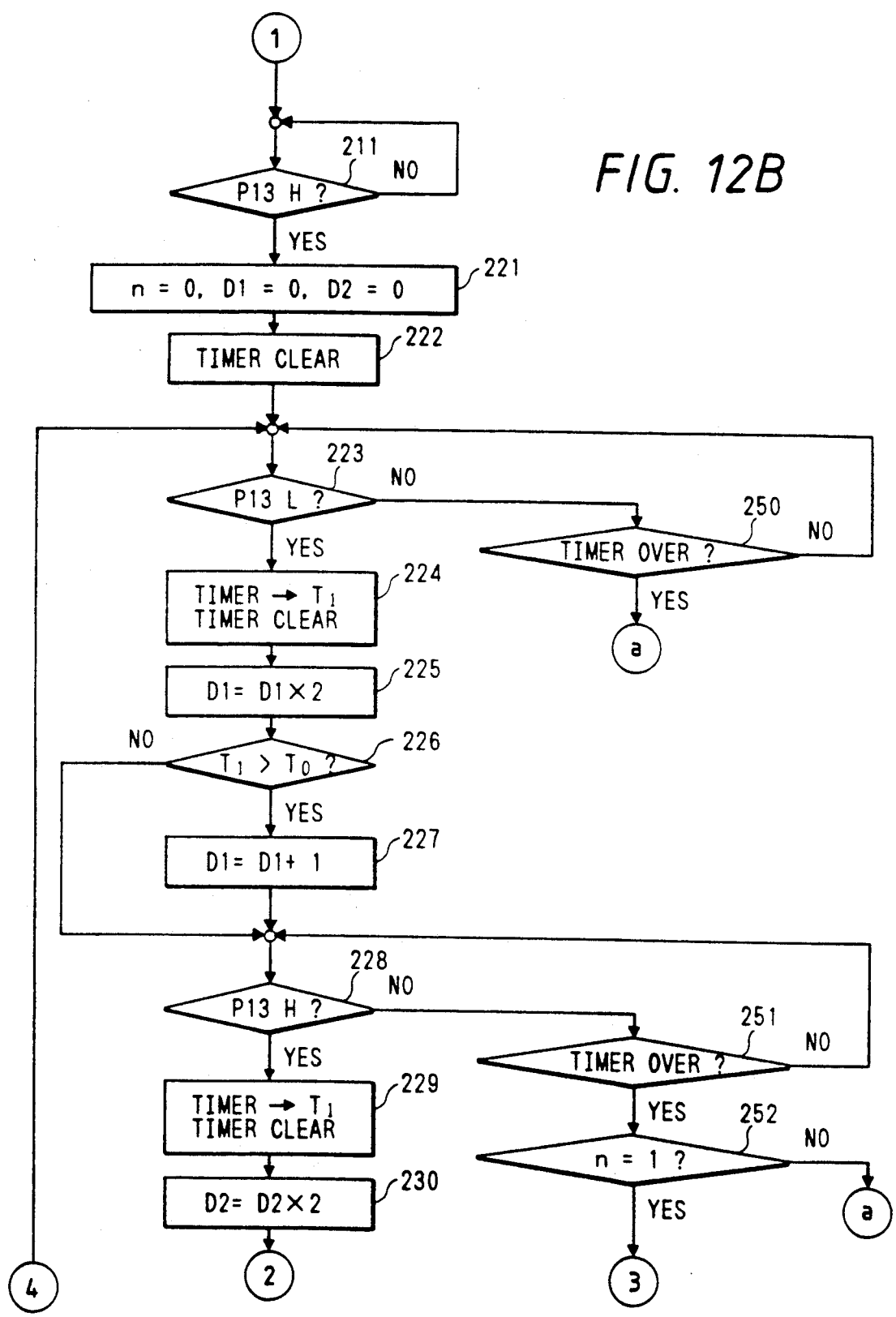
Figure 12C:
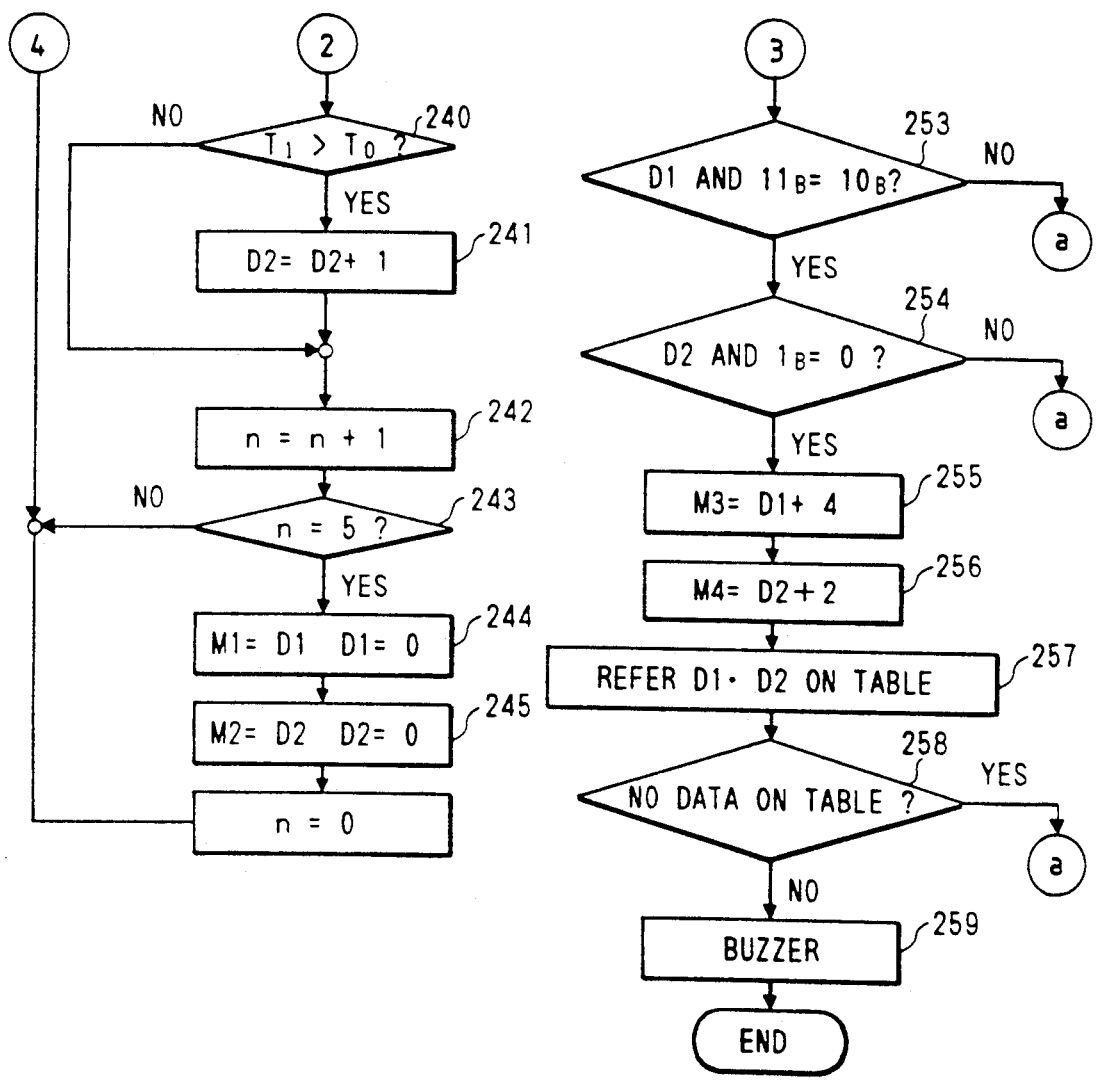

The bar code reading operation will now be described with reference to the flowchart of FIG. 12.

As previously described, when the output of the detection circuit 103, i.e., the input to the input port P13 of the microcomputer MCU 101, is at a high level, the bar code portion 118 is in the state of bar, and when the output of the detection circuit 103 is at a low level, the bar code portion 118 is in the state of space.

Six registers T0, T1, T2, n, D1 and D2 are prepared in the RAM in the MCU 101. First, at a step 200, it is waited for for the first bar to be found out, and at steps 201-203, the time of the first narrow bar is measured, and at steps 204 to 206, the time of the narrow space is measured, and at steps 207 to 209, the time of the next narrow bar is measured, and 1.5 times the maximum value thereof is used as a time T0 to be used to judge whether the bar is narrow or wide.

When the measurement of the time T0 by the start bar is terminated, at a step 221, a register for data is cleared and the reading of data is started.

At steps 223 and 224, the time of the bar is read and if it is greater than the time T0, it is judged to be "1", and the data is doubled and "1" is added thereto. In the other cases, doubling alone is effected. At steps 228 and 229, the time of the space is read and if likewise, it is greater than the time T0, it is judged to be "1" and a similar operation is performed.

Each time one set of bar and space is read, the register n is incremented and the reading of the bar and the space is repeated. If at a step 243, n is "5", it is judged that the reading of one digit has been terminated, and at steps 244 and 245, the values of D1 and D2 are memorized in M1 and M2, respectively, and D1, D2 and n are cleared.

At steps 250 and 251, the overflow of a timer is detected. If there is the overflow, it is judged that the reading of the bar code has been terminated. If at the step 250, there is the overflow, it is 20 judged to be an error and again, (a), i.e., the operation from the step 200, is performed. If at the step 251, there is the overflow, whether the termination is normal is checked up by the number of bars first at a step 252, and then at steps 253 and 254, the end bar is checked up, and if the result is NG (the termination is not normal), it is judged to be an error and again, the operation from (a) is performed. If the termination is judged to be normal, the display to the effect that reading has been done accurately is done by the buzzer 116.

Description will now be made of the operation when the bar code of the bar code portion 118a of FIG. 10 is read in the above-described construction.

The bar code of the bar code portion 118a, as previously described, means a number of four digits 0126, and this data means the control content of the camera in each digit, and the content is as shown in FIG. 13. That is, the first digit expresses the AF mode, the feed mode and the photometry mode by a number, the second digit is indicative of the focus detection point selection as it is transformed into a number, the third digit expresses the AE mode, and the fourth digit is indicative of the set value thereof as it is transformed into a number. For example, in the case of "0126", the first digit is 0 and therefore means one-shot AF mode and the feed mode single and the mode of center priority photometry, the second digit is 1 and therefore distance measurement is effected at the center distance measurement point, the third digit is 2 and therefore means the AV priority AE mode, and the aperture value thereof means that control is effected at f 2.8 from the value of the fourth digit.

In order to select the photograph 119a from the bar code list 153 and read the code portion 118a corresponding thereto, the code portion 118a is traced while depressing the switch 109. When the switch 109 is depressed, the microcomputer MCU 101 of the code reading and supplying apparatus 151 renders the output port P21 into a high level and renders the transistor 106 conductive and therefore, the IRED 104 is turned on. At the same time, the microcomputer MCU 101 performs the bar code reading operation (previously described). Here, the bar code portion 118a represents "0126" and therefore, the value thereof is read.

When the switch 110 is then depressed, the microcomputer MCU 101 converts the data in each two digits into BCD code, like "01" and "26", and outputs the BCD code from the SCI of MCU 101. The transistor 107 is rendered conductive by this output and the IRED 108 is turned on. The infrared light emitted from this IRED 108 is detected by PTR and becomes the same signal as the output of the SCI of MCU 101 and is input to the SCI of the microcomputer MC1 of the camera. Thus, the microcomputer MC1 of the camera has received "0126". The microcomputer MC1 of the camera memorizes these data in the areas d1, d2, d3 and d4 of the internal RAM.

Figure 14:
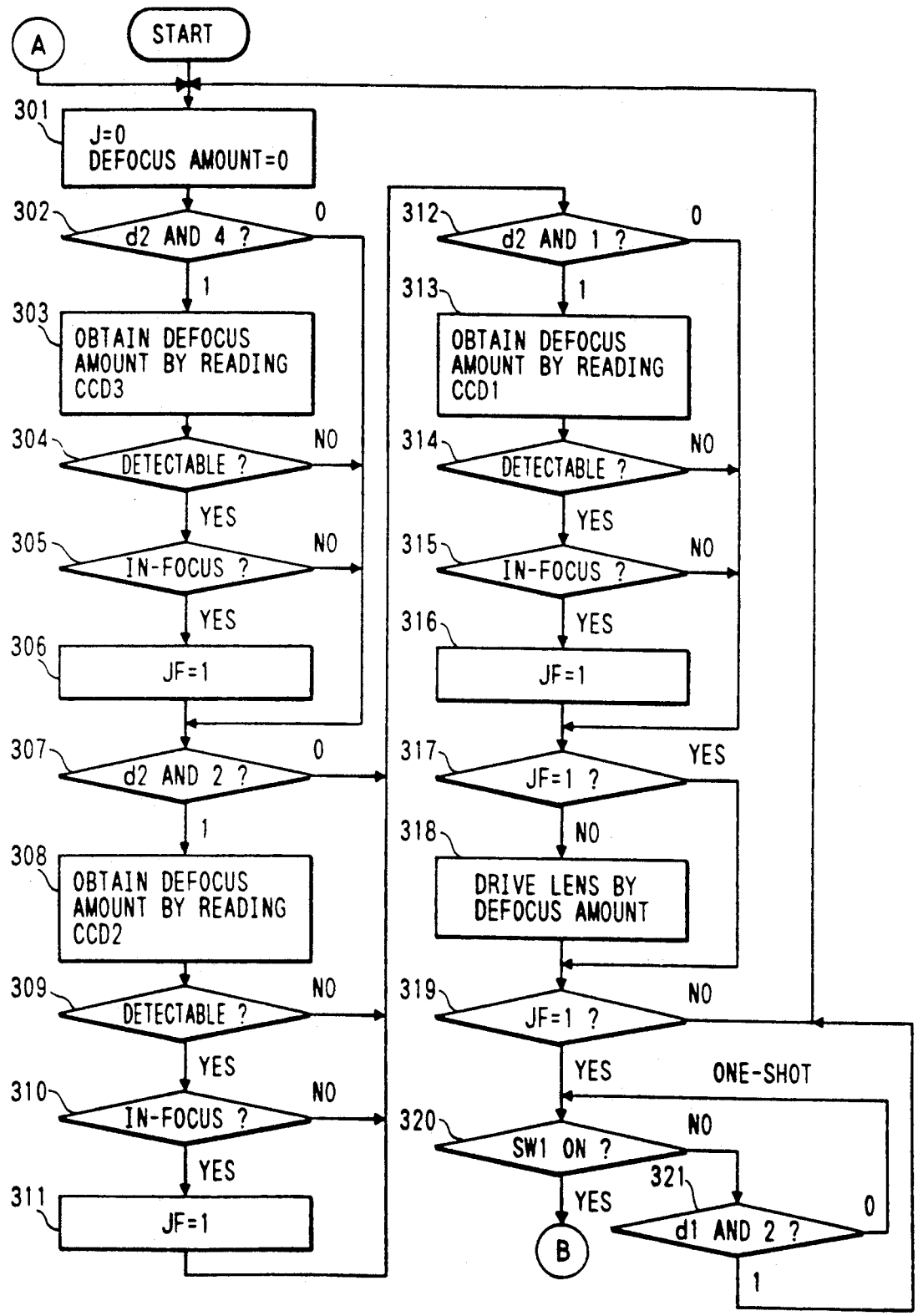
FIGS. 14 and 15 are the control flowcharts of a camera.
Figure 15:
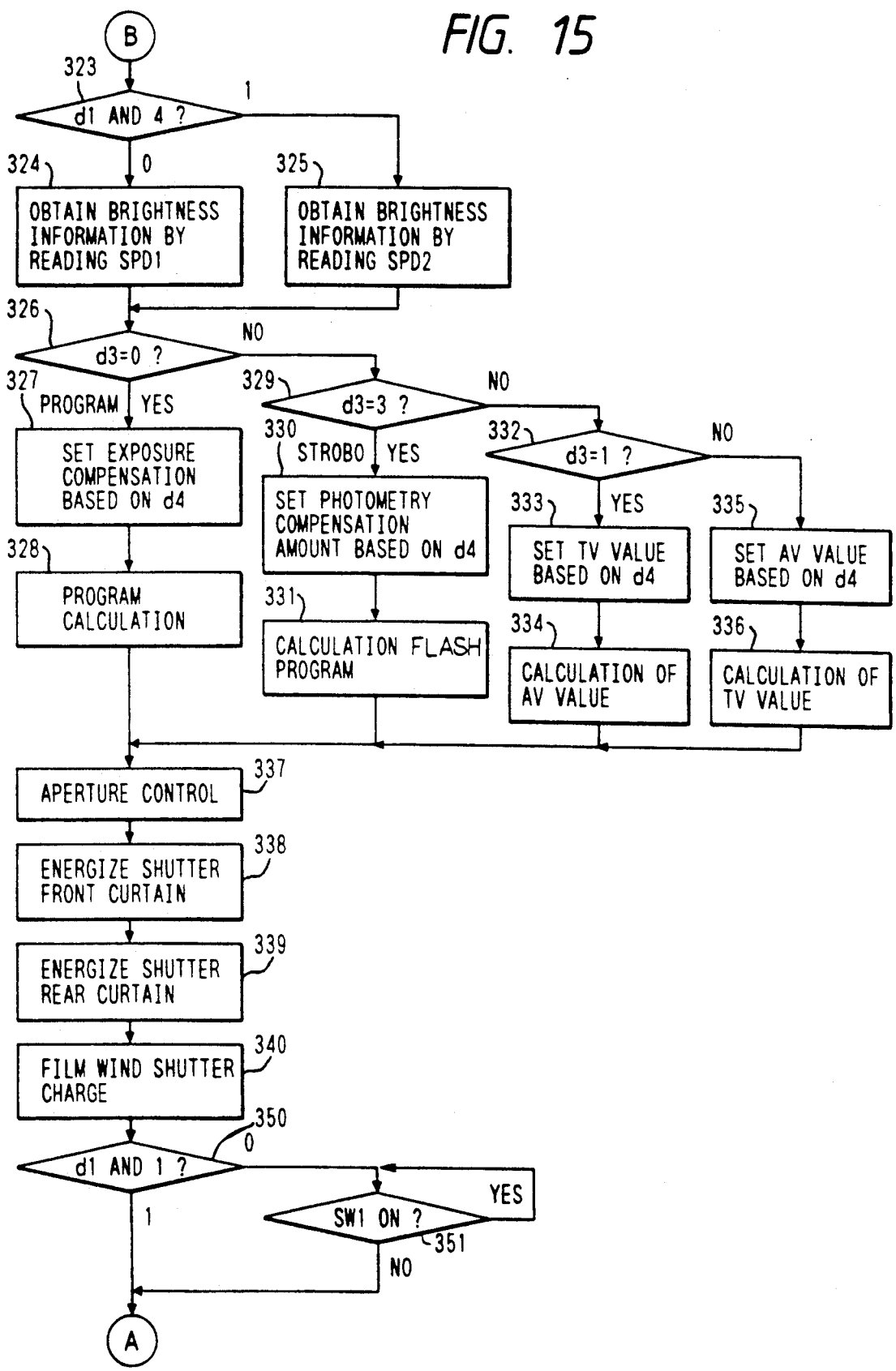

The operation of the camera in a state in which the setting of the aforementioned data d1, d2, d3 and d4 has been done will now be described with reference to the flowcharts of FIGS. 14 and 15.

The initial setting is first effected to render an in-focus flag JF into 0 (step 301), and whether the focus detection at each focus detection point should be done is checked up by the value of the data d2. Whether the focus detection at the right focus detection point should be done is first checked up (step 302), and if the focus detection should be done, the value of CCD3 is read to thereby obtain the defocus amount (step 303). If here, the focus detection is impossible or the in-focus cannot be obtained, advance is made to a step 307 (steps 304 and 305). If the lens is in the in-focus state, the flag JF is rendered into 1 (step 306). A similar operation is performed at each focus detection point. Steps 307-311 correspond to the left focus detection point, and steps 312-316 correspond to the center focus detection point. Accordingly, if the in-focus is obtained at any selected focus detection point, the in-focus flag JF becomes 1 and the defocus amount of the selected focus detection point is obtained.

If here, the lens is not in focus, the lens is moved by that defocus amount (step 318). This is repeated until the lens is in focus.

Now, d2=1 and therefore, the focus detection at the left and right focus detection points is not effected, but the focus detection only at the center focus detection point is effected. If here, the in-focus state is reached, the program waits for the release switch SW1 being depressed during the one-shot AF mode, depending on the value of D1 (step 321), and in the case of servo, the operation of the initial setting step 301 onward is repeated.

Now d1=0 and therefore, one-shot operation is performed and the program waits for the release switch SW1 being depressed. When the release switch SW1 is depressed, the photometry range is selected by the value of the data d1 (step 323), and the output value of SPD1 or SPD2 is read to thereby obtain the brightness of the object (step 324). Now d1=0 and therefore, the value of SPD1 is read.

The AE mode is then determined by the value of d3. If d3=0 (step 326), the exposure compensation amount is set in accordance with the value of d4 (step 327), and on the basis of the compensated value, the calculation of the exposure program is effected (step 328). If d3=3, the photometry compensation amount is output to the D/A converter FL1 on the basis of the value of the data d4 through BUS5 (step 330). If d3=1, the TV value is set on the basis of the value of the data d4 (step 333), and if d3=2, the AV value is set on the basis of the value of the data d4 (step 335). Now d3=2 and d4=6 and therefore, f2.8 is set as the aperture value (step 335), and from this and the output of SPD1, the TV value is calculated (step 336). When the process proceeds to the step 330, the flash program calculation is performed in the step 331 and when the process proceeds to the step 333, AV value calculation is performed in the step 334.

Subsequently, the aperture is controlled by the aperture value obtained in this manner (step 337), and the shutter rear curtain is electrically energized correspondingly to the shutter speed obtained by the shutter front curtain being electrically energized (steps 338 and 339), whereby the release operation is performed at the obtained aperture value and shutter speed value.

The motor M1 is then driven to effect the film feeding and the shutter charge to thereby bring about a state in which the next release is possible. Here, if the value of the data d1 is a single shot, the program waits for the release switch SW1 being released (step 251), and if the value of the data d1 is a continuous shot, return is immediately made to (a) and the operation described above is repeated. Since now d1=0 indicates a single shot, the program waits for the release switch SW1 being released and returns to (a).

In the manner described above, control corresponding to the bar code 118a is effected. A similar operation is effected for the bar code 118b, and in this case, focus detection is effected at the right focus detection point and aperture control is effected at f11.

A third embodiment will now be described.

In FIG. 8, the microcomputer MC1 of the camera corresponds to the positions 1 to 7 of the dial DIAL1 besides the data d1, d2, d3 and d4, and has form RAM areas per each position, and controls the indication driving circuit DD1 correspondingly to that position to thereby effect indication. It is to be understood that the areas of the RAM correspond to positions n and are named dn1, dn2, dn3 and dn4, respectively.

In the above-described construction, when the dial DIAL1 is at the position 3, the input port P3 of the microcomputer MC1 is caused to assume a low level by the rotary switch SW2 and "3" is displayed on a display panel DISP1 by the indication driving circuit DD1. When in this state, the bar code 118a is read and the transfer of the data is effected, the microcomputer MC1 effects the setting of "0", "1", "2" and "6" on RAM areas d31, d32, d33 and d34, respectively, corresponding to 3 of the dial DIAL1. When the dial DIAL1 is then set to "4" and the bar code 118b is read to effect setting, "0", "4", "2" and "2" are likewise set on RAM areas d41, d42, d43 and d44, respectively.

When here, the camera is operated with the dial DIAL1 set to "3", the camera shifts the values of d31, d32, d33 and d34 corresponding to "3" to d1, d2, d3 and d4, respectively, and then effects control in accordance with the contents thereof (the operation at this time is similar to that previously described). When the dial DIAL1 is then set to "4", the camera shifts the values of d41, d42, d43 and d44 to d1, d2, d3 and d4, respectively, and effects control.

In the manner described above, control is effected at each dial position by a bar code of different content.

The control items of the camera are not limited to those hitherto described, but may be any items which the user can so far set by the camera.

While these bits of control information are controlled by a bar code, all bits of control information need not always be made into a bar code, but one bit of control information may be transmitted by a bar code.

Also, in the present embodiment, bar codes are used as what represents the photographing data based on examples, whereas the present invention is not restricted thereto, but use may be made of anything which permits one-to-one correspondence to a photograph and can be easily converted into an electrical signal. For example, use may be made of a magnetic card recently widely used on which data are written and on the surface which a photograph is printed.

Also, photographs (or printed matters) have been shown as examples, but use may be made of whatever the photographer can visually perceive. For example, if the image of an example of photograph is recorded as the image of a video tape and data similar to that in the above described embodiment which has been modulated by a particular frequency is recorded on the sound portion of the video tape and the reading and supplying apparatus 151 is changed from SPD to a microphone and the detection circuit 108 is made to correspond thereto, similar photographing can be accomplished if the reading and supplying apparatus 151 is operated in the portion of the image to be photographed while the video tape is watched by the use of video deck.

As described above, according to the second embodiment, the AE mode, the AF mode, the feed mode, the flash mode, the focus detection point selection information, the photometry compensation amount, the exposure compensation amount, etc. corresponding to the intended example recorded on the example recording medium are read by the information reading and supplying apparatus and transmitted to the control circuit in the camera and the control of a plurality of control items corresponding to the transmitted signals is effected, whereby the user becomes able to easily accomplish photographing which matches the object to be photographed or the purpose of photographing even if he has no knowledge or experience about photography.

Also, if as shown in the third embodiment, a plurality of information sets are memorized in the camera and control is effected with them changed over, the user can accomplish photographing while quickly coping with various objects to be photographed or various purposes of photographing.

I claim:

1. A camera comprising:
    (a) detection means for detecting set information in an information supplying device, wherein the information is a combination of at least exposure mode data and recording movement mode data; and
    (b) control means responsive to the information for performing a particular camera operation on the basis of the result of the detection by said detection means, said particular camera operation including at least exposure control and the control of the movement of a recording medium.

2. A camera according to claim 1, wherein said information supplying device has code detecting means and information supplying means.

3. A camera according to claim 1, wherein said set information is output in the form of a light signal from said information supplying device.

4. A camera according to claim 3, wherein said detection means includes a circuit for receiving said light signal.

5. A camera according to claim 1, wherein said particular camera operation is selected from among a plurality of sets on the basis of said set information.

6. A camera according to claim 1, further comprising switch means for causing the detecting operation by said detection means to be executed.

7. A camera according to claim 1, wherein said particular camera operation further includes the setting of the focus mode.

8. A camera according to claim 1, wherein said exposure control in said particular camera operation is to set at least the shutter time or the aperture value, and said control of the movement of the recording medium is to feed a film so that single shot photographing may be done or to said feed film so that continuous photographing may be done.

9. A camera according to claim 7, wherein said setting of the focus mode is to set one of the servo mode in which the auto-focus operation is continued still after the in-focus and the one-shot mode in which the auto-focus operation is inhibited after the in-focus.

10. A camera according to claim 1, wherein said particular camera operation further includes the selection of a plurality of focus detection points.

11. A camera according to claim 1, wherein said particular camera operation further includes the setting of the photometry mode.

12. A camera according to claim 1, wherein said set information in said information supplying device is the information in an information card.

13. A camera according to claim 1, wherein said control means selects the kind of said particular camera operation in conformity with the operation of an outside operating member.

14. A camera system comprising:
    (A) an information reading and supplying device, wherein the information is a combination of at least exposure mode data and recording movement mode data, including:
        (A-1) first detection means for detecting a code representative of set information; and
        (A-2) output means for converting said set information read by said first detection means into a signal for supply and outputting said signal;
    (B) a camera body including:
        (B-1) second detection means for detecting said signal for supply output from said output means; and
        (B-2) control means responsive to the information for performing a particular camera operation on the basis of the result of the detection by said second detection means, said particular camera operation including at least exposure control and the control of the movement of a recording medium.

15. A camera system according to claim 14, wherein said code is a bar code, and said first detection means reads the information of said bar code by the utilization of light.

16. A camera system according to claim 15, wherein said first detection means has light projecting means and light receiving means for the reading of said bar code, light emitted from said light projecting means is applied to said bar code and the reflected light thereof is discriminated by said light receiving means, whereby the information of said bar code is read.

17. A camera system according to claim 14, wherein said output means includes light signal generating means and outputs said set information by a light signal.

18. A camera system according to claim 17, wherein said second detection means includes a circuit for receiving said light signal.

19. A camera system according to claim 14, wherein said particular camera operation is selected from among a plurality of sets on the basis of said set information.

20. A camera system according to claim 14, wherein said particular camera operation further includes the setting of the focus mode.

21. A camera system according to claim 14, wherein said exposure control in said particular camera operation is to set at least the shutter time or the aperture value, and said control of the movement of the recording medium is to feed a film so that single shot photographing may be done or to feed said film so that continuous photographing may be done.

22. A camera system according to claim 20, wherein said setting of the focus mode is to set one of the servo mode in which the auto-focus operation is continued still after the in-focus and the one-shot mode in which the auto-focus operation is inhibited after the in-focus.

23. A camera system according to claim 14, wherein said particular camera operation further includes the selection of a plurality of focus detection points.

24. A camera system according to claim 14, wherein said particular camera operation further includes the setting of the photometry mode.

25. A camera system according to claim 14, wherein said set information in said information supplying device is the information in an information card.

26. A camera system according to claim 14, wherein said control means selects the kind of said particular camera operation in conformity with the operation of an outside operating member.

27. A camera system comprising:
    (A) an information reading and supplying device, wherein the information is a combination of at least exposure mode data and recording movement mode data, including:
  (A-1) first detection means for detecting a bar code representative of set information; and
  (A-2) output means for converting said set information read by said first detection means into a signal for supply and outputting said signal; and
(B) a camera body including:
  (B-1) second detection means for detecting said signal for supply output from said output means; and
  (B-2) control means responsive to the information for performing a particular camera operation on the basis of the result of the detection by said second detection means, said control means setting a plurality of camera modes including at least the control of the movement of a recording medium at a time and performing said particular camera operation.

28. A camera system according to claim 27, wherein said plurality of camera modes include at least two of the exposure control mode, the recording medium movement control mode and the auto-focus mode.

29. A camera system according to claim 27, wherein said plurality of camera modes include at least two of the exposure control mode, the recording medium movement control mode, the auto-focus mode, the focus detection point selecting mode and the photometry mode.

30. A camera system according to claim 28, wherein said exposure control in said particular camera operation is to set at least the shutter time or the aperture value, and said control of the movement of the recording medium is to feed a film so that single shot photographing may be done or to feed said film so that continuous photographing may be done.

31. A camera system according to claim 30, wherein said setting of the focus mode is to set one of the servo mode in which the auto-focus operation is continued still after the in-focus and the one-shot mode in which the auto-focus operation is inhibited after the in-focus.

* * * * *

UNITED STATES PATENT AND TRADEMARK OFFICE
CERTIFICATE OF CORRECTION

PATENT NO. : 5,278,603
DATED : January 11, 1994
INVENTOR(S) : JIRO KAZUMI

It is certified that error appears in the above-indentified patent and that said Letters Patent is hereby corrected as shown below:

ON THE COVER PAGE ITEM

[30] FOREIGN APPLICATION PRIORITY DATA

"1-34457" should read --2-34457--

COLUMN 2:

Line 65, "OR circuit 16" should read --OR circuit 17--.

COLUMN 3:

Line 12, "the," should read --the--.
Line 63, "for," should read --for--.

COLUMN 4:

Line 20, "their," should read --their--.
Line 46, "optical," should read --optical--.

COLUMN 5:

Line 30, "ends," should read --ends--.
Line 53, "and," should read --and--.

UNITED STATES PATENT AND TRADEMARK OFFICE
CERTIFICATE OF CORRECTION

PATENT NO. : 5,278,603
DATED : January 11, 1994
INVENTOR(S) : JIRO KAZUMI

It is certified that error appears in the above-indentified patent and that said Letters Patent is hereby corrected as shown below:

COLUMN 6:

Line 15, "54," should read --154,--.
Line 58, "hexadecimal," should read --hexadecimal--.

COLUMN 7:

Line 18, "the," should read --the--.
Line 48, "reading," should read --reading--.

COLUMN 8:

Line 15, "SPD1a" should read --SPD21a--.
Line 34, "input," should read --input--.
Line 35, close up left margin.
Line 66, "executed," should read --executed--.

COLUMN 10:

Line 1, "51 side," should read --151 side,--.
Line 2, "designate" should read --designates--.
Line 5, "an ROM, an RAM, IO," should read --a ROM, a RAM, an IO,--.
Line 45, "R5 and R7" should read R5, R6 and R7--.

UNITED STATES PATENT AND TRADEMARK OFFICE
CERTIFICATE OF CORRECTION

PATENT NO. : 5,278,603
DATED : January 11, 1994
INVENTOR(S) : JIRO KAZUMI

It is certified that error appears in the above-indentified patent and that said Letters Patent is hereby corrected as shown below:

COLUMN 11:

Line 48, "NPP" should read --NPN--.

COLUMN 13:

Line 58, "20" should be deleted.

COLUMN 15:

Line 12, "D1" should read --d1--.
Line 65, "form" should read --four--.

COLUMN 18:

Line 5, "signal:" should read --signal;--.

Signed and Sealed this

Twenty-seventh Day of September, 1994

Attest:

BRUCE LEHMAN

*Attesting Officer*     *Commissioner of Patents and Trademarks*